(12) United States Patent
Drake et al.

(10) Patent No.: US 10,885,098 B2
(45) Date of Patent: Jan. 5, 2021

(54) METHOD, SYSTEM AND APPARATUS FOR GENERATING HASH CODES

(71) Applicant: CANON KABUSHIKI KAISHA, Tokyo (JP)

(72) Inventors: Barry James Drake, Thornleigh (AU); Andrew Peter Downing, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 14/854,689

(22) Filed: Sep. 15, 2015

(65) Prior Publication Data

US 2017/0075887 A1 Mar. 16, 2017

(51) Int. Cl.
G06F 16/51 (2019.01)
G06F 16/583 (2019.01)

(52) U.S. Cl.
CPC .......... G06F 16/51 (2019.01); G06F 16/5838 (2019.01)

(58) Field of Classification Search
CPC .............. G06F 17/3028; G06F 17/30256
USPC .......................................................... 707/747
See application file for complete search history.

(56) References Cited

U.S. PATENT DOCUMENTS

| | | | |
|---|---|---|---|
| 7,353,224 B2 | 4/2008 | Chen et al. | |
| 8,199,973 B2 | 6/2012 | Noguchi et al. | |
| 8,447,032 B1 | 5/2013 | Covell et al. | |
| 8,515,964 B2 | 8/2013 | Ravikumar et al. | |
| 8,571,306 B2 | 10/2013 | Reznik et al. | |
| 8,676,725 B1 | 3/2014 | Lin et al. | |
| 8,712,216 B1 | 4/2014 | Covell et al. | |
| 8,867,836 B2 | 10/2014 | Warfield et al. | |
| 8,891,878 B2 | 11/2014 | Rane et al. | |
| 2004/0125992 A1* | 7/2004 | Aoki ................. | G06K 9/00228 382/118 |
| 2007/0088510 A1 | 4/2007 | Li et al. | |
| 2008/0313252 A1* | 12/2008 | Kim ...................... | H04L 1/0045 708/441 |
| 2010/0070509 A1 | 3/2010 | Li et al. | |
| 2010/0138456 A1 | 6/2010 | Aghili | |
| 2010/0189320 A1* | 7/2010 | Dewaele ................. | G06T 7/162 382/128 |
| 2010/0205213 A1 | 8/2010 | Broder et al. | |
| 2010/0266175 A1* | 10/2010 | Seung ...................... | G06T 7/11 382/128 |
| 2011/0314548 A1* | 12/2011 | Yoo .......................... | G06F 21/56 726/24 |
| 2012/0155766 A1* | 6/2012 | Zhang ................. | G06F 16/5838 382/173 |

(Continued)

Primary Examiner — Taelor Kim
Assistant Examiner — Abdullah A Daud
(74) Attorney, Agent, or Firm — Canon U.S.A., Inc. I.P. Division

(57) ABSTRACT

A method of generating hash codes from a query vector. An ordering of dimensions is determined for a lattice hole in an A* lattice, the lattice hole being located nearest to the query vector and the ordering of dimensions represents a mapping applied to transform a canonical hole of the A* lattice to the lattice hole. An initial hash code is determined for a first point in the A* lattice, based on the query vector, using a plurality of predetermined constants. A subsequent hash code is generated for a second point in the A* lattice, from the initial hash code by modifying the initial hash code by a multiple of a constant. The constant is selected from the plurality of predetermined constants using the determined ordering of dimensions.

14 Claims, 18 Drawing Sheets

(56) References Cited

U.S. PATENT DOCUMENTS

| | | | |
|---|---|---|---|
| 2013/0046767 A1 | 2/2013 | Lee et al. | |
| 2013/0239208 A1* | 9/2013 | Suominen | H04L 67/06 726/19 |
| 2013/0279806 A1* | 10/2013 | Tonisson | G06F 16/56 382/173 |
| 2014/0086492 A1 | 3/2014 | Iwamura et al. | |
| 2014/0112572 A1* | 4/2014 | Reif | G06T 7/33 382/154 |
| 2014/0169681 A1* | 6/2014 | Drake | G06K 9/468 382/197 |
| 2014/0226913 A1* | 8/2014 | Ruzon | G06K 9/4609 382/243 |
| 2014/0236963 A1* | 8/2014 | Drake | G06F 16/56 707/747 |
| 2015/0100558 A1 | 4/2015 | Fan | |
| 2015/0293985 A1* | 10/2015 | Young | G06F 16/1834 707/610 |
| 2015/0338550 A1* | 11/2015 | Wadsley | E21B 43/00 703/2 |
| 2016/0048625 A1* | 2/2016 | Ho | G06F 30/398 716/124 |
| 2017/0262898 A1* | 9/2017 | Hersch | G06N 20/00 |

\* cited by examiner

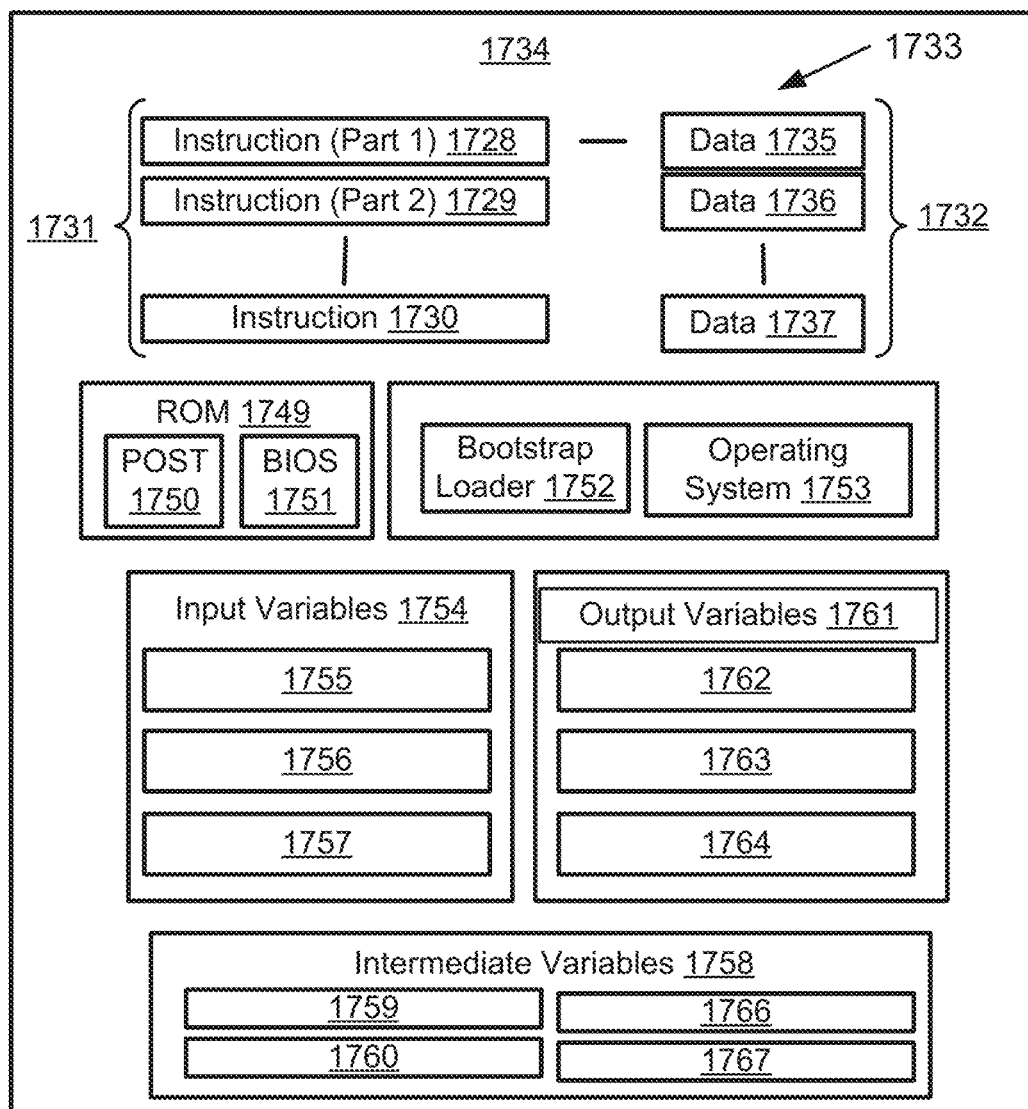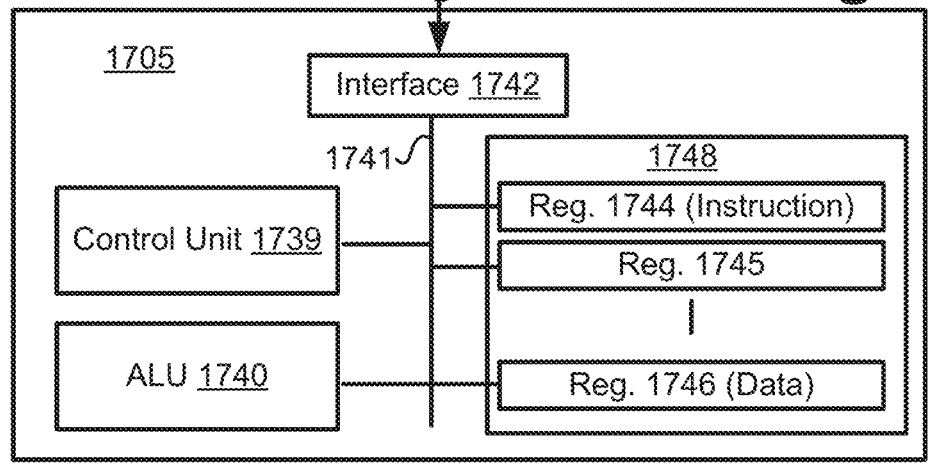
Fig. 17B

METHOD, SYSTEM AND APPARATUS FOR GENERATING HASH CODES

TECHNICAL FIELD

The present disclosure relates to high-dimensional similarity searching and, in particular, to the field of segmenting an image into classified regions. The present invention also relates to a method, system and apparatus for generating hash codes from a query vector. The present invention also relates to a computer program product including a computer readable medium having recorded thereon a computer program for generating hash codes from a query vector.

BACKGROUND

Segmenting an image is the act of taking a pixel representation of an image and grouping pixels into groups, each group representing a region of the image, where a region may also be called a "segment" of the image. A region may also be classified into one of a number of possible classifications, where a classification has some meaning. For example, classifications may include "sky", "tree", "mountain", "person", "car", and "truck". Thus, a pixel of an image has a classification by virtue of the pixel being part of a classified region.

Many methods have been proposed for segmenting and classifying regions of an image. One method, based on patch matching, uses sample images that have previously been segmented and regions classified. The method divides each sample image into patches (e.g., each patch may be a rectangle of 32×32 pixels). The patches are chosen without regard to the classified regions. For each patch, a feature vector is constructed for the patch. For example, the feature vector may be the concatenation of the CIELab colour of each pixel in the patch and may also include edge features which capture the contrast between a pixel and neighbours of the pixel. The pixels of each patch also have a classification by virtue of the pixels being part of a classified region. Thus, the sample images are used to generate a database of pairs, where each pair contains a feature vector of a patch and classifications of pixels of the patch. The database of pairs can be used to segment and classify regions of an input image. The input image is divided into patches. For each patch, a feature vector is constructed for the patch, using the same construction method as was applied to the sample images. For each patch of the input image, the database of pairs is queried to find pairs that match the patch. A pair matches a patch if the pair is one with a feature vector that matches the feature vector of the patch. Two feature vectors are said to match if the feature vectors are similar. Once matching pairs are found for each patch of the input image, the matching pairs are used to assign classifications to pixels of the input image, so that the input image is segmented into classified regions.

One of the problems with patch matching is how to quickly find, in a database, those feature vectors that match a feature vector of a patch of an input image.

Hash-based strategies provide patch matching methods that are both fast and accurate. Hash-based methods involve computing a hash code for each vector in a database, and using the hash code to associate records within the database with entries in a hash table. At query time, a hash code is computed for a query vector and the hash code is used to quickly find matching records in the hash table. For such a method to be effective, a 'locality sensitive' hash function may be used. A locality sensitive hash function returns the same hash code for vectors that are close to each other. A locality sensitive hash function partitions a feature space into regions, where each region is associated with a particular hash code.

One problem that exists with hash-based patch matching methods is that for any hash function there will always be two vectors that are close but return different hash codes. This problem occurs when the two vectors are located on either side of a partition boundary and leads to the problem of false-negative matches. False-negative matches occur when the patch matching method fails to find similar vectors because the respective hash codes of the similar vectors are different. Multi-probe locality sensitive hash methods overcome such false-negative problems by performing multiple probes per query. The multiple probes are performed by using a hash code associated with a region of the feature space that is near to the query point.

A lattice-based hash generates multiple probes using lattice geometry. In a lattice-based hash, hash codes for patches of sample images are created from points in a high dimensional lattice. The query hash codes are determined by finding a Delaunay cell containing the query point, and computing a hash code for each lattice point at the vertex of the Delaunay cell. The A* lattice may be used for lattice-based hash methods.

A problem with multi-probe locality sensitive hash methods is that the time to generate the hash codes can be long. This problem is particularly apparent when multiple probes are generated using lattice geometry. This problem occurs because, for an n-dimensional lattice, it takes order $O(n)$ operations to generate a hash code for one lattice point corresponding to one probe. The best multi-probe methods use order $O(n)$ probes per query vector. Thus the time to query, for one query vector, is order $O(n^2)$.

Patch matching methods for segmenting and classifying regions of an image may use feature vectors of high dimensionality. Thus, a need exists for a multi-probe locality sensitive hash method that is faster and that requires less than order $O(n^2)$ operations per query vector.

SUMMARY

It is an object of the present invention to substantially overcome, or at least ameliorate, one or more disadvantages of existing arrangements.

According to one aspect of the present disclosure, there is provided a method of generating hash codes from a query vector, the method comprising:

determining an ordering of dimensions for a lattice hole in an A* lattice, the lattice hole being located nearest to the query vector and the ordering of dimensions represents a mapping applied to transform a canonical hole of the A* lattice to the lattice hole;

determining an initial hash code for a first point in the A* lattice, based on the query vector, using a plurality of predetermined constants; and generating a subsequent hash code for a second point in the A* lattice, from the initial hash code by modifying the initial hash code by a multiple of a constant, the constant being selected from the plurality of predetermined constants using the determined ordering of dimensions.

According to another aspect of the present disclosure, there is provided a system for generating hash codes from a query vector, the system comprising:

a memory for storing data and a computer program;

a processor for executing said computer program, said computer program comprising code for:

determining an ordering of dimensions for a lattice hole in an A* lattice, the lattice hole being located nearest to the query vector and the ordering of dimensions represents a mapping applied to transform a canonical hole of the A* lattice to the lattice hole;

determining an initial hash code for a first point in the A* lattice, based on the query vector, using a plurality of predetermined constants; and generating a subsequent hash code for a second point in the A* lattice, from the initial hash code by modifying the initial hash code by a multiple of a constant, the constant being selected from the plurality of predetermined constants using the determined ordering of dimensions.

According to still another aspect of the present disclosure, there is provided an apparatus for generating hash codes from a query vector, the apparatus comprising:

means for determining an ordering of dimensions for a lattice hole in an A* lattice, the lattice hole being located nearest to the query vector and the ordering of dimensions represents a mapping applied to transform a canonical hole of the A* lattice to the lattice hole;

means for determining an initial hash code for a first point in the A* lattice, based on the query vector, using a plurality of predetermined constants; and means for generating a subsequent hash code for a second point in the A* lattice, from the initial hash code by modifying the initial hash code by a multiple of a constant, the constant being selected from the plurality of predetermined constants using the determined ordering of dimensions.

According to still another aspect of the present disclosure, there is provided a computer readable medium having a computer program stored thereon for generating hash codes from a query vector, the program comprising:

code for determining an ordering of dimensions for a lattice hole in an A* lattice, the lattice hole being located nearest to the query vector and the ordering of dimensions represents a mapping applied to transform a canonical hole of the A* lattice to the lattice hole;

code for determining an initial hash code for a first point in the A* lattice, based on the query vector, using a plurality of predetermined constants; and code for generating a subsequent hash code for a second point in the A* lattice, from the initial hash code by modifying the initial hash code by a multiple of a constant, the constant being selected from the plurality of predetermined constants using the determined ordering of dimensions.

Other aspects are also disclosed.

BRIEF DESCRIPTION OF THE DRAWINGS

One or more embodiments of the invention will now be described with reference to the following drawings, in which:

FIGS. 17A and 17B collectively form a schematic block diagram representation of an electronic device upon which described arrangements can be practised.

DETAILED DESCRIPTION INCLUDING BEST MODE

Figure 1:
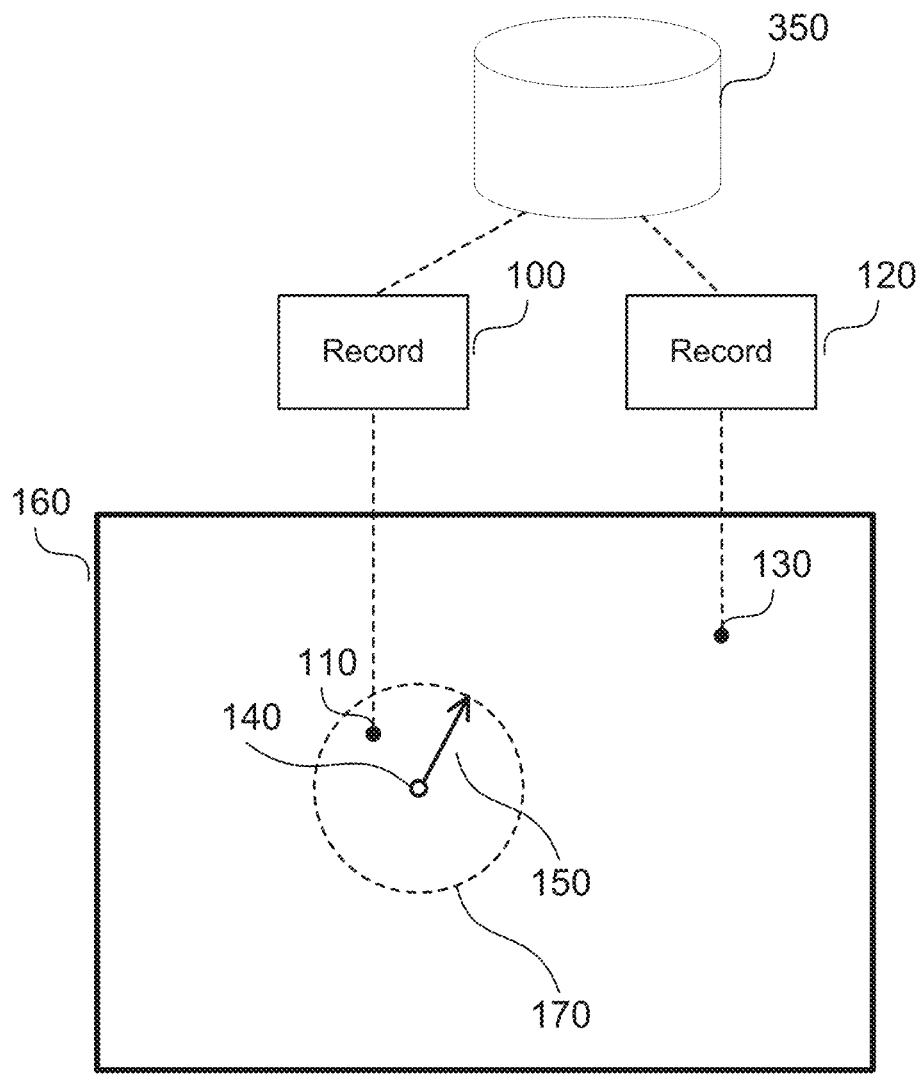
FIG. 1 is a diagram showing a spatial interpretation of a vector, query point, and query radius.

Where reference is made in any one or more of the accompanying drawings to steps and/or features, which have the same reference numerals, those steps and/or features have for the purposes of this description the same function (s) or operation(s), unless the contrary intention appears.

The present disclosure relates to storage and retrieval of records. Described arrangements may be used in a retrieval system to create and access a hash table for efficiently retrieving records associated with n-dimensional feature vectors, where the vectors of the retrieved records are located within a specified query radius of a given query vector. The described arrangements are particularly useful when false-negatives are costly. The retrieval system described here may be used to minimise false-negatives when the query radius is known at the time that the retrieval system is configured.

As described below, a registration phase relates to the storage of one or more records. A query phase relates to retrieval of one or more of the stored records, in accordance with search criteria. The registration phase generates a hash code for a feature vector based on the feature vector. The registration phase then associates a record associated with the feature vector with the generated hash code in the hash table. The query phase identifies those hash codes that are used by vectors that satisfy search criteria.

A retrieval system configured in accordance with the present disclosure may be implemented to store and retrieve records associated with patches of images, wherein each patch is associated with a feature vector and a record. The feature vector may be used as a key for storing the corresponding record. The record contains information relating to the image. The information may include, for example, but is not limited to, the corresponding feature vector, the image, a patch of the image, a sub-sampled version of the image, owner information, access information, printing information, the classification of pixels within a patch of the image, or any combination thereof.

A retrieval system configured in accordance with the present disclosure may also be implemented for non-imaging applications, such as the retrieval of text, a portion of text, or a paper-fingerprint. A paper finger-print is an image of paper fibre structure of a page that can be used to uniquely identify a piece of paper.

A method, system, and computer program product for linking a hash code to a patch of an image is described below. The method selects a lattice point in a multidimensional lattice close to a feature vector representing the patch of the image. The method determines a lattice point using a method, such as determining a nearest lattice point to the feature vector. The method assigns the feature vector to the determined lattice point and stores a link between a hash code associated with the determined lattice point and the patch of the image.

A hash table storage and retrieval method, system, and computer program product is also described below. The hash table retrieval method performs a registration phase to store at least one record in a hash table and a query phase to retrieve at least one of the stored records from the hash table. For each of the stored records, the registration phase generates a hash code for a feature vector associated with the record, based on the feature vector and a present state of a hash table, and associates the record with the generated hash code in the hash table. The query phase identifies hash codes for the hash table that are associated with feature vectors that satisfy search criteria and retrieves at least one record assigned to at least one of the identified hash codes.

A method for segmenting and classifying regions of an image which is based on patch matching is also described below. The method uses sample images that have previously been segmented and regions classified to generate a database of pairs.

Figure 17A:
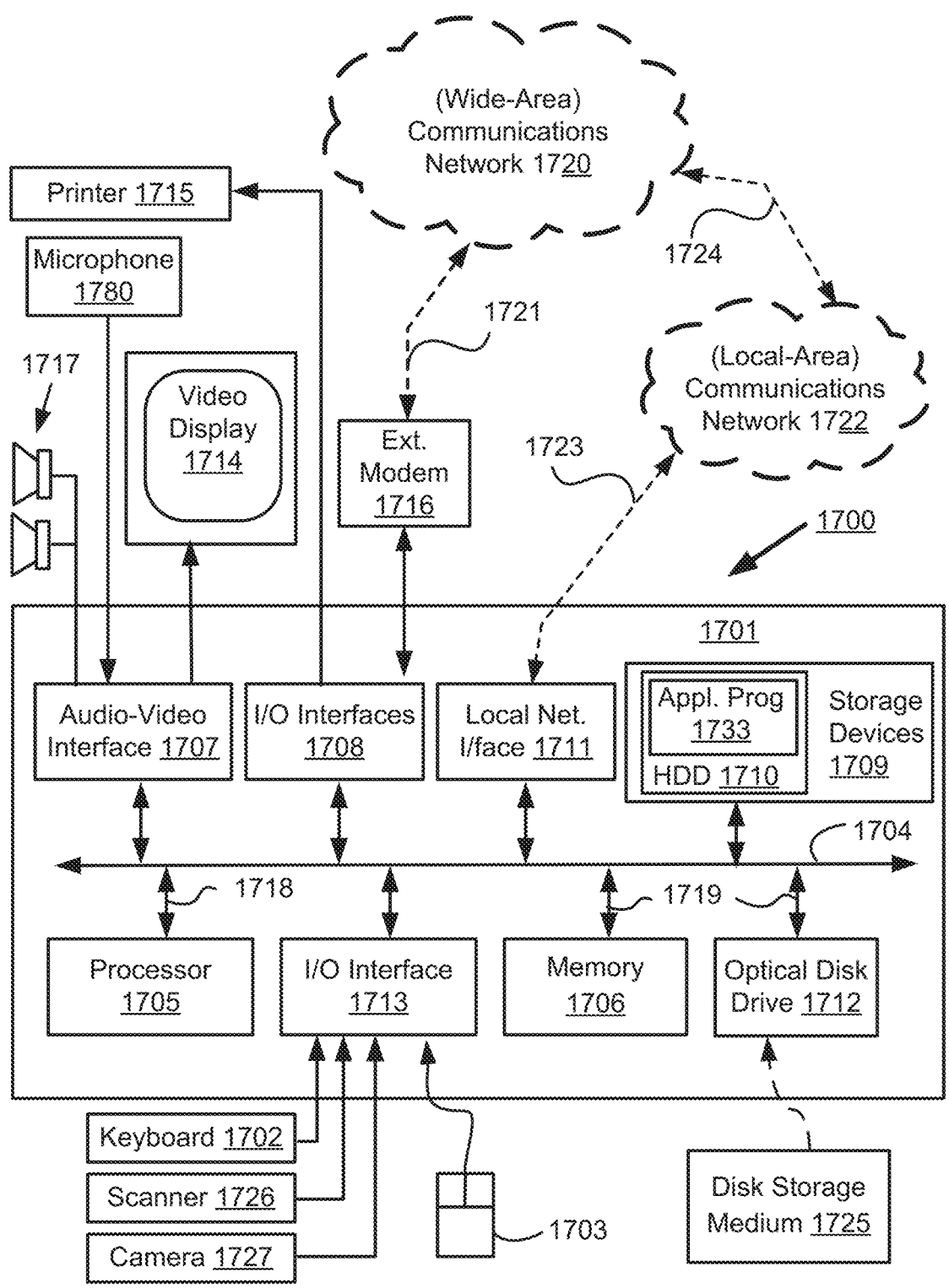

FIGS. 17A and 17B depict a general-purpose computer system 1700, upon which the various arrangements described can be practiced.

As seen in FIG. 17A, the computer system 1700 includes: a computer module 1701; input devices such as a keyboard 1702, a mouse pointer device 1703, a scanner 1726, a camera 1727, and a microphone 1780; and output devices including a printer 1715, a display device 1714 and loudspeakers 1717. An external Modulator-Demodulator (Modem) transceiver device 1716 may be used by the computer module 1701 for communicating to and from a communications network 1720 via a connection 1721. The communications network 1720 may be a wide-area network (WAN), such as the Internet, a cellular telecommunications network, or a private WAN. Where the connection 1721 is a telephone line, the modem 1716 may be a traditional "dial-up" modem. Alternatively, where the connection 1721 is a high capacity (e.g., cable) connection, the modem 1716 may be a broadband modem. A wireless modem may also be used for wireless connection to the communications network 1720.

The computer module 1701 typically includes at least one processor unit 1705, and a memory unit 1706. For example, the memory unit 1706 may have semiconductor random access memory (RAM) and semiconductor read only memory (ROM). The computer module 1701 also includes an number of input/output (I/O) interfaces including: an audio-video interface 1707 that couples to the video display 1714, loudspeakers 1717 and microphone 1780; an I/O interface 1713 that couples to the keyboard 1702, mouse 1703, scanner 1726, camera 1727 and optionally a joystick or other human interface device (not illustrated); and an interface 1708 for the external modem 1716 and printer 1715. In some implementations, the modem 1716 may be incorporated within the computer module 1701, for example within the interface 1708. The computer module 1701 also has a local network interface 1711, which permits coupling of the computer system 1700 via a connection 1723 to a local-area communications network 1722, known as a Local Area Network (LAN). As illustrated in FIG. 17A, the local communications network 1722 may also couple to the wide network 1720 via a connection 1724, which would typically include a so-called "firewall" device or device of similar functionality. The local network interface 1711 may comprise an Ethernet circuit card, a Bluetooth® wireless arrangement or an IEEE 802.11 wireless arrangement; however, numerous other types of interfaces may be practiced for the interface 1711.

The I/O interfaces 1708 and 1713 may afford either or both of serial and parallel connectivity, the former typically being implemented according to the Universal Serial Bus (USB) standards and having corresponding USB connectors (not illustrated). Storage devices 1709 are provided and typically include a hard disk drive (HDD) 1710. Other storage devices such as a floppy disk drive and a magnetic tape drive (not illustrated) may also be used. An optical disk drive 1712 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1700.

The components 1705 to 1713 of the computer module 1701 typically communicate via an interconnected bus 1704 and in a manner that results in a conventional mode of operation of the computer system 1700 known to those in the relevant art. For example, the processor 1705 is coupled to the system bus 1704 using a connection 1718. Likewise, the memory 1706 and optical disk drive 1712 are coupled to the system bus 1704 by connections 1719. Examples of computers on which the described arrangements can be practised include IBM-PC's and compatibles, Sun Sparcstations, Apple Mac™ or like computer systems.

The methods described here may be implemented using the computer system 1700 wherein the processes of FIGS. 1 to 16, to be described, may be implemented as one or more software application programs 1733 executable within the computer system 1700. In particular, the steps of the described methods are effected by instructions 1731 (see FIG. 17B) in the software 1733 that are carried out within the computer system 1700. The software instructions 1731 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1700 from the computer readable medium, and then executed by the computer system 1700. The software 1733 is typically stored in the HDD 1710 or the memory 1706. A computer readable medium having such software or computer program recorded on the computer readable medium is a computer program product. The use of the computer program product in the computer system 1700 preferably effects an advantageous apparatus for implementing the described methods.

In some instances, the application programs 1733 may be supplied to the user encoded on one or more CD-ROMs 1725 and read via the corresponding drive 1712, or alternatively may be read by the user from the networks 1720 or 1722. Still further, the software can also be loaded into the computer system 1700 from other computer readable media. Computer readable storage media refers to any non-transitory tangible storage medium that provides recorded instructions and/or data to the computer system 1700 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1701. Examples of transitory or non-tangible computer readable transmission media that may also participate in the provision of software, application programs, instructions and/or data to the computer module 1701 include radio or infra-red transmission channels as well as a network connection to another computer or networked device, and the Internet or Intranets including e-mail transmissions and information recorded on Websites and the like.

The second part of the application programs 1733 and the corresponding code modules mentioned above may be executed to implement one or more graphical user interfaces (GUIs) to be rendered or otherwise represented upon the display 1714. Through manipulation of typically the keyboard 1702 and the mouse 1703, a user of the computer system 1700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1717 and user voice commands input via the microphone 1780.

FIG. 17B is a detailed schematic block diagram of the processor 1705 and a "memory" 1734. The memory 1734 represents a logical aggregation of all the memory modules (including the HDD 1709 and semiconductor memory 1706) that can be accessed by the computer module 1701 in FIG. 17A.

When the computer module 1701 is initially powered up, a power-on self-test (POST) program 1750 executes. The POST program 1750 is typically stored in a ROM 1749 of the semiconductor memory 1706 of FIG. 17A. A hardware device such as the ROM 1749 storing software is sometimes referred to as firmware. The POST program 1750 examines hardware within the computer module 1701 to ensure proper functioning and typically checks the processor 1705, the memory 1734 (1709, 1706), and a basic input-output systems software (BIOS) module 1751, also typically stored in the ROM 1749, for correct operation. Once the POST program 1750 has run successfully, the BIOS 1751 activates the hard disk drive 1710 of FIG. 17A. Activation of the hard disk drive 1710 causes a bootstrap loader program 1752 that is resident on the hard disk drive 1710 to execute via the processor 1705. This loads an operating system 1753 into the RAM memory 1706, upon which the operating system 1753 commences operation. The operating system 1753 is a system level application, executable by the processor 1705, to fulfill various high level functions, including processor management, memory management, device management, storage management, software application interface, and generic user interface.

The operating system 1753 manages the memory 1734 (1709, 1706) to ensure that each process or application running on the computer module 1701 has sufficient memory in which to execute without colliding with memory allocated to another process. Furthermore, the different types of memory available in the system 1700 of FIG. 17A must be used properly so that each process can run effectively. Accordingly, the aggregated memory 1734 is not intended to illustrate how particular segments of memory are allocated (unless otherwise stated), but rather to provide a general view of the memory accessible by the computer system 1700 and how such is used.

As shown in FIG. 17B, the processor 1705 includes a number of functional modules including a control unit 1739, an arithmetic logic unit (ALU) 1740, and a local or internal memory 1748, sometimes called a cache memory. The cache memory 1748 typically includes a number of storage registers 1744-1746 in a register section. One or more internal busses 1741 functionally interconnect these functional modules. The processor 1705 typically also has one or more interfaces 1742 for communicating with external devices via the system bus 1704, using a connection 1718. The memory 1734 is coupled to the bus 1704 using a connection 1719.

The application program 1733 includes a sequence of instructions 1731 that may include conditional branch and loop instructions. The program 1733 may also include data 1732 which is used in execution of the program 1733. The instructions 1731 and the data 1732 are stored in memory locations 1728, 1729, 1730 and 1735, 1736, 1737, respectively. Depending upon the relative size of the instructions 1731 and the memory locations 1728-1730, a particular instruction may be stored in a single memory location as depicted by the instruction shown in the memory location 1730. Alternately, an instruction may be segmented into a number of parts each of which is stored in a separate memory location, as depicted by the instruction segments shown in the memory locations 1728 and 1729.

In general, the processor 1705 is given a set of instructions which are executed therein. The processor 1705 waits for a subsequent input, to which the processor 1705 reacts to by executing another set of instructions. Each input may be provided from one or more of a number of sources, including data generated by one or more of the input devices 1702, 1703, data received from an external source across one of the networks 1720, 1702, data retrieved from one of the storage devices 1706, 1709 or data retrieved from a storage medium 1725 inserted into the corresponding reader 1712, all depicted in FIG. 17A. The execution of a set of the instructions may in some cases result in output of data. Execution may also involve storing data or variables to the memory 1734.

The disclosed arrangements use input variables 1754, which are stored in the memory 1734 in corresponding memory locations 1755, 1756, 1757. The disclosed arrangements produce output variables 1761, which are stored in the memory 1734 in corresponding memory locations 1762, 1763, 1764. Intermediate variables 1758 may be stored in memory locations 1759, 1760, 1766 and 1767.

Referring to the processor 1705 of FIG. 17B, the registers 1744, 1745, 1746, the arithmetic logic unit (ALU) 1740, and the control unit 1739 work together to perform sequences of micro-operations needed to perform "fetch, decode, and execute" cycles for every instruction in the instruction set making up the program 1733. Each fetch, decode, and execute cycle comprises:

a fetch operation, which fetches or reads an instruction 1731 from a memory location 1728, 1729, 1730;

a decode operation in which the control unit 1739 determines which instruction has been fetched; and an execute operation in which the control unit 1739 and/or the ALU 1740 execute the instruction.

Thereafter, a further fetch, decode, and execute cycle for the next instruction may be executed. Similarly, a store cycle may be performed by which the control unit 1739 stores or writes a value to a memory location 1732.

Each step or sub-process in the processes of FIGS. 1 to 16 is associated with one or more segments of the program 1733 and is performed by the register section 1744, 1745, 1747, the ALU 1740, and the control unit 1739 in the processor 1705 working together to perform the fetch, decode, and execute cycles for every instruction in the instruction set for the noted segments of the program 1733.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 3:
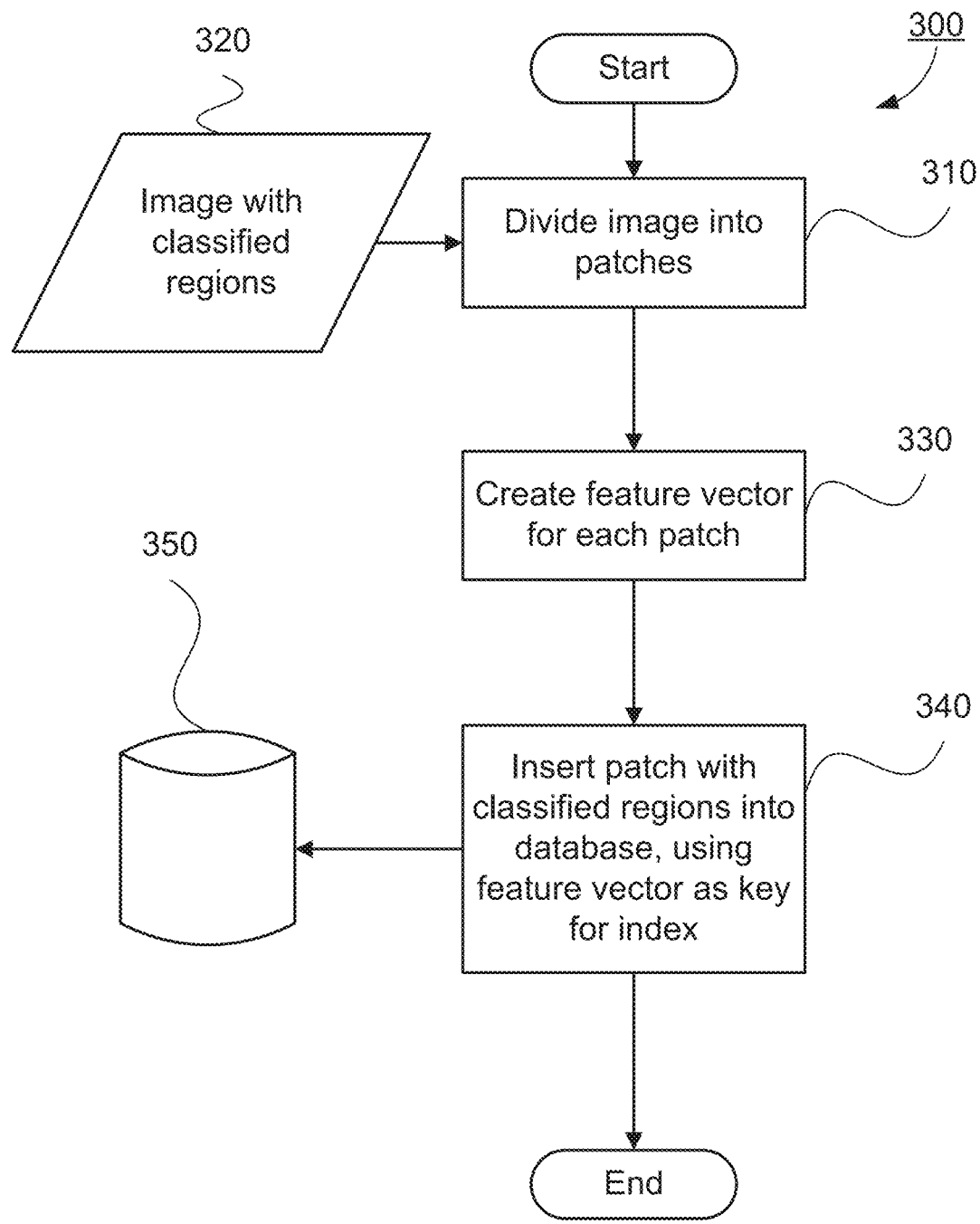
FIG. 3 is a schematic flow diagram showing a method of generating a database of pairs.

A method 300 of generating a database of pairs will now be described with reference to FIG. 3. The method 300 may be implemented as one or more software code modules of the software application program 1733 resident on the hard disk drive 1710 and being controlled in its execution by the processor 1705.

The method 300 begins at a dividing step 310, where an image 320 with classified regions is accessed, under execution of the processor 1705, and is divided into patches. The image 320 may be accessed from the memory 1706, for example. In one arrangement, the image 320 is divided into patches using a moving window of 32×32 pixels across the image 320. The window may be moved with a step size for vertical movement and a step size for horizontal movement. Each location of the window may be used as a patch.

Control is then passed from step 310 to a creating step 330, where for each patch defined in step 310, a feature vector is created for the patch. A feature vector may be created at step 330 by concatenating features of the pixels in the patch, like the CIELab colour of each pixel in the patch and may also include edge features which capture the contrast between a pixel and neighbours of the pixel. Other features included in the feature vector may be properties of the patch such as the location horizontally and vertically of the patch in the image 320.

Control is then passed from step 330 to an inserting step 340, where for each patch defined in step 310, information for the patch including the classification of each pixel of the patch is recorded (or stored) in a database 350 configured, for example, in the memory 1706. The information for a patch may be retrieved from the database 350 using a feature vector similar to the feature vector of the patch as created in step 330. The feature vector used to retrieve the information is used as a key for indexing each pair in the database 350. The method 300 terminates following step 340.

Figure 4:
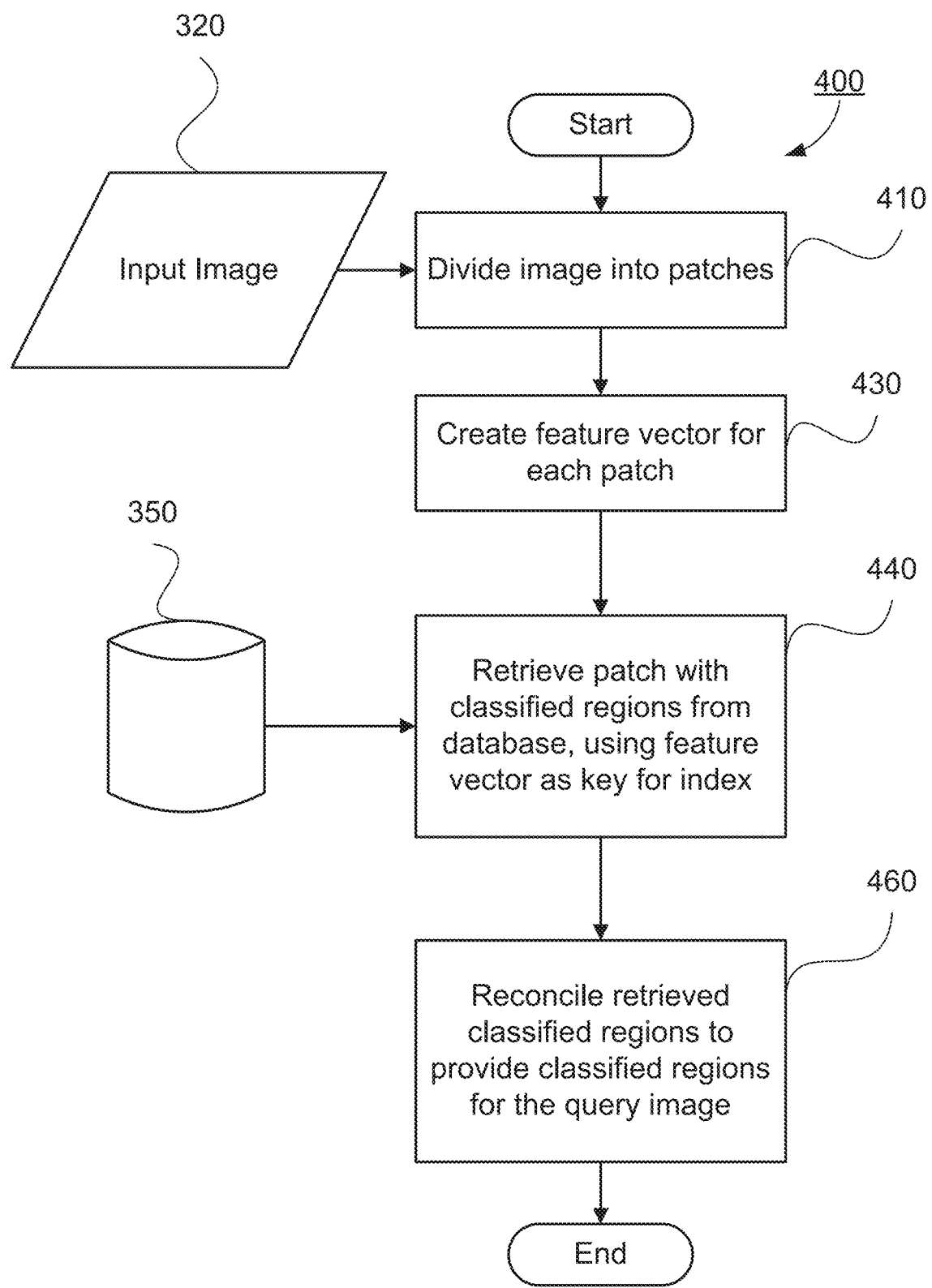
FIG. 4 is a schematic flow diagram showing a method of generating classified regions of an image.

A method 400 of generating classified regions of an input image will now be described with reference to FIG. 4. The method 400 may be implemented as one or more software code modules of the software application program 1733 resident on the hard disk drive 1710 and being controlled in its execution by the processor 1705.

The method 400 begins at dividing step 410, where an input image 420 is accessed, under execution of the processor 1705, and divided into patches. The image 420 may be accessed from the memory 1706, for example. The image 420 may be divided into patches at step 310 using the same method used in step 310 of the method 300 as described above.

Control is then passed from step 410 to a creating step 430, where for each patch defined in step 410, a feature vector is created for the patch. In one arrangement, the feature vector is created at step 430 using the same method as the method used in step 330 of method 300, so as to permit sensible matching of feature vectors.

Control is then passed from step 430 to a retrieving step 440, where for each patch defined in step 410, the feature vector created in step 430 corresponding to the patch is used to query the database of pairs 350 that was created in method 300. The database of pairs 350 provides for each patch of the input image 420, a collection of matching pairs. A pair is said to match a patch if the pair comprises a feature vector that matches the feature vector of the patch. Two feature vectors are said to match if the two feature vectors are similar. Each retrieved pair also has associated with the pair information about the classification of each pixel of a patch as recorded in the database 350. Thus, at the completion of step 440, each patch of the input image has retrieved information about the classification of each pixel of a patch as recorded in the database 350. The feature vector used to retrieve the information at step 430 is used as a key for indexing each pair in the database 350.

Control is then passed from step 440 to a reconciling step 460, where information about the classification of each pixel of a patch is used to assign a classification to each pixel of the input image 420, thus achieving the result of generating classified regions of the input image 420. A simple voting method may be used at step 460 to assign a classification to each pixel of the input image 420. In an alternative arrangement, a weighted voting method may be used at step 460 to assign a classification to each pixel of the input image 420, where a weight is determined based on the quality of match between feature vectors. In still another arrangement, a Markov random field may be used to assign a classification to each pixel of the input image 420, as the Markov random field increases spatial consistency of pixel classifications. The method 400 terminates following step 460.

FIG. 1 shows one arrangement for the database 350 that may be used at step 440 of the method 400.

Feature vectors produced from an image, such as a feature vector created in step 330 of method 300, are shown in a feature space representation in FIG. 1. Vectors may be treated as points in a space such as feature space 160 of FIG. 1. For this reason, the terms 'vector', 'feature vector', and 'point' may be used interchangeably to refer to an array of numbers that represent a patch of an image. As a feature vector may be treated as a point, the distance between two points may be treated as a measure of dis-similarity between the two corresponding feature vectors.

As an example, FIG. 1 shows the database 350, in which are stored two records, 100 and 120. The two records 100 and 120 are respectively associated with first and second patches, which are not shown. The records 100 and 120 may store the same type of information about the respective first and second patches. In one example, record 100 stores information for the first patch about the classification of each pixel of the first patch; and record 120 stores information for the second patch about the classification of each pixel of the second patch. Alternatively, the records 100 and 120 may store different types of information about the respective first and second patches. The records 100 and 120 are associated with feature vectors 110 and 130, respectively. The vectors 110 and 130 have a spatial interpretation in the feature space 160.

When a patch ("query patch") is used to search for any similar patches stored in a database, a query vector 140 is a feature vector produced from the query patch that is being used for the search. Finding patches stored in the database 350 that are similar to the query patch is achieved by retrieving records within a predetermined radius of the query vector 140 derived from that query patch. Such a predetermined radius is shown in FIG. 1 by a radius 150, defining a circular query region 170 around the query vector 140. Vectors located inside the query region 170, such as feature vector 110, are defined as matches for the query vector 140, while vectors outside the query region, such as feature vector 130, are non-matches for the query vector 140. The radius 150 may be considered as a measure of the maximum allowed dis-similarity between a query vector and a feature vector. As feature vector 110 is within the query region 170, record 100 associated with feature vector 110 is returned in response to the query vector 140, whereas feature vector 130 is outside the query region, so record 120 is not returned.

Thus, the feature vector 110 is derived from a first patch and the query vector 140 (or feature vector) is derived from a query patch (not shown). Feature vector 110 falls within the radius 150 of the query vector 140 indicating a required level of similarity between the first patch and the query patch. Therefore, the record 100 is returned. The record 100 may store any type of information associated with the first patch.

In one arrangement, a multi-probe locality sensitive hash method may be used to search for any similar patches stored in a database such as the database 350 of FIG. 1. At inserting step 340, a method 500 of storing an association between a feature vector and a payload, may be executed as will be described in detail below with reference to FIG. 5. Further, at step 440 of method 400, a method 600 of retrieving payloads using a query vector, may be executed as will be described in detail below with reference to FIG. 6. Methods 500 and 600 respectively store and retrieve payload data which is data that permits direct access to records such as records 100 and 120 as shown in FIG. 1. For example, payload data may be a directed representation of a record. Alternatively, payload data may be a reference to record data stored elsewhere such that the payload data enables direct access to the records.

Figure 5:
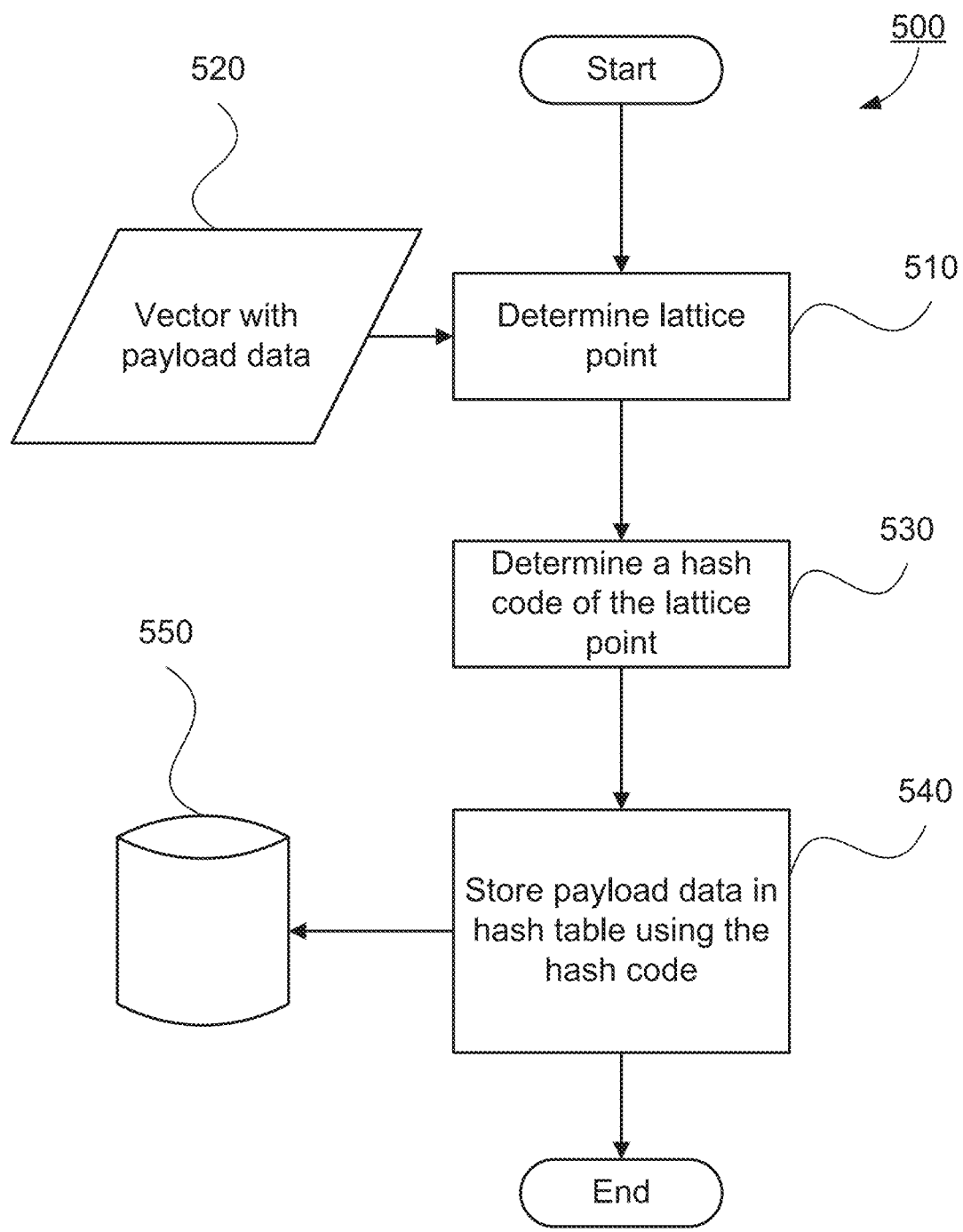
FIG. 5 is a schematic flow diagram showing a method of storing an association between a vector and a payload.

The method 500 of storing an association between a feature vector and a payload, as may be executed at step 340, will now be described with reference to FIG. 5. The method 500 may be implemented as one or more software code modules of the software application program 1733 resident on the hard disk drive 1710 and being controlled in its execution by the processor 1705.

The method 500 starts at a lattice point determining step 510, where a feature vector with payload data 520 is received under execution of the processor 1705. A lattice point is determined to represent the received feature vector with payload data 520. The lattice point may be a nearest A* lattice point to the feature vector 520, or may be the nearest A* lattice point for some function of the feature vector 520.

Control is then passed from step 510 to hash code determining step 530, where a hash code is determined for the lattice point determined in step 510.

A hash function may be defined as an A* lattice, also known as a Permutohedral lattice. The A* lattice can be defined in terms of the A lattice family. The lattice $A_n$ may be defined in accordance with Equation (1) as follows:

$$A_n = \{p \in \mathbb{Z}^{(n+1)} | \Sigma_{i=0}^n p[i] = 0\} \quad (1).$$

where $A_n$ is an n-dimensional lattice, that is embedded in $\mathbb{R}^{n+1}$, a n+1 dimensional Euclidean space, to make the coordinates integers. The dual of $A_n$ is $A^*_n$, similarly embedded inside the same n-dimensional subspace, the subspace consisting of points whose coordinates sum to zero. The dual lattice $A^*_n$ is the set of vectors (in the n-dimensional subspace) whose dot product with each vector in $A_n$ is an integer. The dual lattice $A^*_n$ may be defined in accordance with Equation (2) as follows:

$$A^*_n = \{p \in \mathbb{R}^{(n+1)} | \Sigma_{i=0}^n p[i] = 0, \forall q \in A_n, (p.q)/(n+1) \in \mathbb{Z}\} \quad (2).$$

An alternative definition of an n-dimensional A* lattice is also given as $A^*_n$ in Equation (3) as follows:

$$A^*_n = \cup_{k=0}^n \{(n+1)c + k\mathbf{1} | c \in \mathbb{Z}^{(n+1)}, \Sigma_{i=0}^n c[i] = -k\} \quad (3).$$

In Equation (3), 1 represents the n-dimensional vector where each coordinate is one (1). Equation (3) shows that $A^*_n$ is the set of points that is the union of n+1 subsets, each with a different k value where k=0, 1, ..., n. A subset with a particular corresponding k value is defined using a set of c-vectors each c-vector has n+1 integer coordinates that sum to $-k$. A lattice point in $A^*_n$ is given by (n+1)c+k1, where c is a c-vector with n+1 integer coordinates that sum to $-k$.

The definition of the $A^*_n$ lattice in Equation (3) leads to lattice points with n+1 integer coordinates that sum to zero. The $A^*_n$ lattice points are represented in an n+1 dimensional lattice-representation space, but the lattice points fit in an n-dimensional quantisation space that is a subspace of the $\mathbb{R}^{(n+1)}$ lattice representation space.

A quantisation space may be used to provide access to records associated with features in a feature space using multi-probe locality sensitive hashing. A point in the quantisation space may be determined for a feature in the feature space using any suitable method that is capable of mapping a feature in the feature space to a point in the quantisation space. Often, such mappings are linear or affine and may or may not involve dimensional reduction.

Each lattice point is uniquely identified by a corresponding vector c which may be referred to as a c-vector. The sum of the coordinates of c is $-k$, where k is one of n+1 values, namely zero (0) though to n. A lattice point whose c coordinates sum to $-k$ is referred to as a remainder-k point. Given c, the coordinates of the corresponding lattice point is (n+1)c+k1, which is equal to $(n+1)c - (\Sigma_{i=0}^n c[i])\mathbf{1}$.

In one arrangement, lattice points are hashed to access a hash table. A c-vector uniquely identifies a lattice point, $l = (n+1)c - (\Sigma_{i=0}^n c[i])\mathbf{1}$. Therefore, a hash code for any lattice point is h(c), where h is a hash function over arrays of integers.

When a record with an associated feature vector is received, a nearby lattice point is selected and used to determine a hash code for the feature vector. A nearby lattice point is a point in the lattice that corresponds to a corner of the Delaunay cell containing the feature vector, for example the nearest lattice point to the feature vector. A hash function may be applied to the lattice point to determine the hash code.

A hash code is determined using the function h of a lattice point c-vector, c, in accordance with Equation (4) as follows:

$$h(c) = \Sigma_{i=0}^n 31^i c[i] \mod 2^{64} \quad (4).$$

wherein the hash code, h(c), for the lattice point c-vector, c, is the sum of product terms for each value of an indexing variable, i, where i=0, 1, . . . n, and where each product term is the product of an ith predetermined constant, $31^i$ (which is the ith power of 31) and the ith dimension of the offset vector, l. The initial hash code, $h_1$, may be determined in modulo $2^{64}$ arithmetic.

Setting predetermined constants to powers of 31 (i.e., $31^i$) is one method of defining predetermined constants that lead to good hash codes; any useful set of predetermined constants may be used. In one arrangement, the hash code is determined at step 530 in modulo $2^{64}$ arithmetic so that the hash code fits conveniently within a 64 bit integer; alternatively, any other size integer may be suitable. If 64-bit unsigned integer arithmetic is used, then the mod $2^{64}$ operation need not be explicitly implemented as allowing the integers to overflow is an equivalent operation.

The method 500 concludes at storing step 540, where the payload data associated with the feature vector 520 is stored in a hash table 550 using the hash code determined at step 530.

Figure 6:
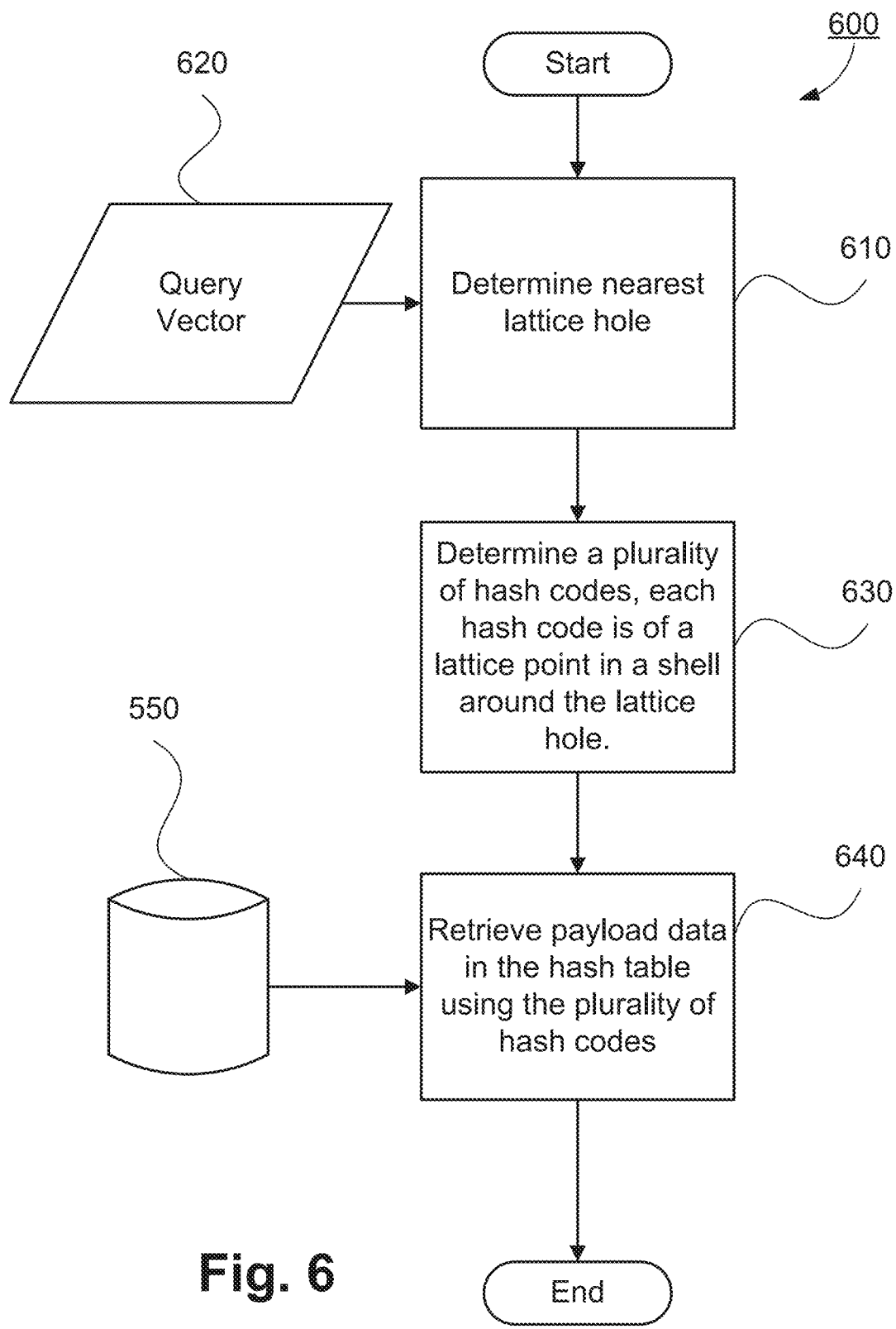
FIG. 6 is a schematic flow diagram showing a method of retrieving payloads using a query vector.

A method 600 of retrieving payloads using a query vector, as may be executed at step 440, will now be described with reference to FIG. 6. The method 600 may be implemented as one or more software code modules of the software application program 1733 resident on the hard disk drive 1710 and being controlled in its execution by the processor 1705.

The method 600 begins at a lattice hole determining step 610, where a query vector 620 is received under execution of the processor 1705. A lattice hole is determined at step 610 to represent the received query vector 620. Lattice holes will now be described.

The Voronoi cells of the lattice points of a lattice define a partitioning of a quantisation space. Lattice $A^*_2$ leads to hexagonal cells. The point where a local maximum number Voronoi cells touch is known as a 'hole'. For an $A^*_n$ lattice, the maximum number of touching Voronoi cells is n+1 (c.f. $2^n$ for scalar quantisation). The region that is a set of points that are closest to a hole form a Delaunay cell, which has a lattice point at each vertex. The vertices are exactly the lattice points of the Voronoi cells that touch the hole. The scale of a lattice may be defined via the packing radius of the lattice, which is the radius of the largest ball fully inside a Voronoi cell.

Figure 13:
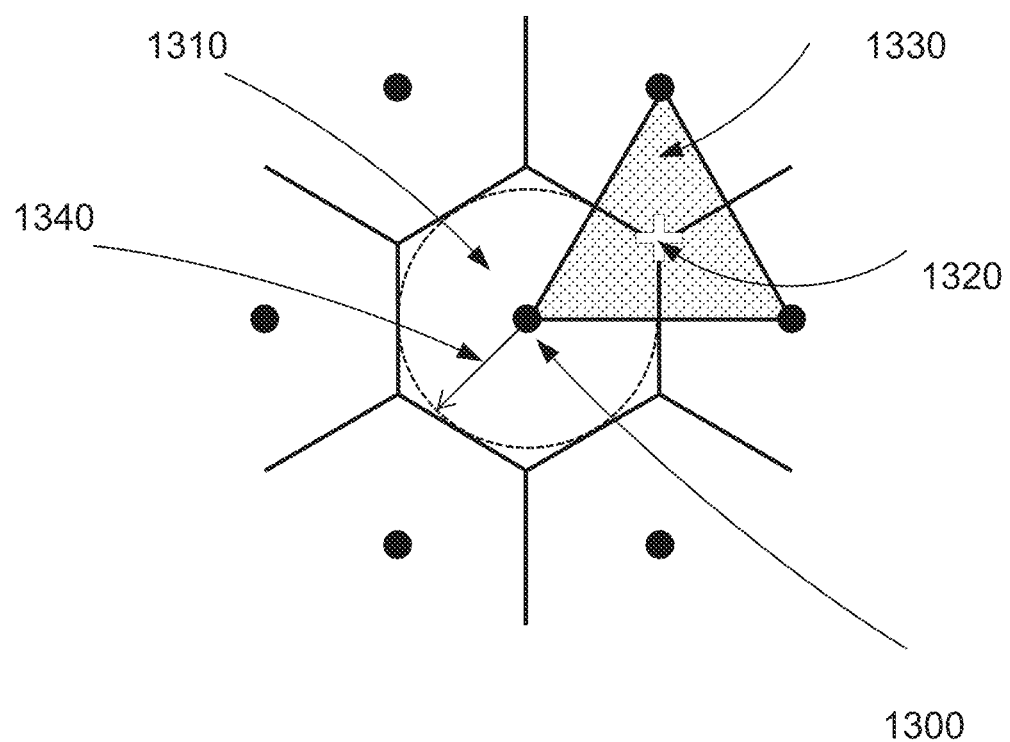
FIG. 13 is a diagram of a portion of an A* lattice.

The conceptual parts of a lattice are shown in FIG. 13. FIG. 13 is a diagram of a portion of an $A^*_2$ lattice. FIG. 13 shows a lattice point 1300. The hexagonal region around lattice point 1300 is a corresponding Voronoi cell 1310. FIG. 13 also shows packing radius 1340 and a hole 1320. The shaded region about the hole 1320 is a corresponding Delaunay cell 1330. The Delaunay cell 1330 has three vertices, each vertex is a lattice point, of which lattice point 1300 is one.

Each hole of an A* lattice (or equivalently, each Delaunay cell of an A* lattice) may be represented as an offset vector which is a remainder zero lattice point, and a sort vector which is an ordering of the n+1 dimensions.

A nearest hole to the query vector 630 is determined at step 610 using any suitable method. The method of determining the nearest hole to the query vector 630 used at step 610 represents the hole as an offset vector (as a c-vector) and sort vector (as sorting of dimensions, also known as a permutation of dimensions).

Control is then passed from step 610 to a hash codes determining step 630, where a plurality of hash codes are determined under execution of the processor 1705. Each hash code determined at step 630 is a hash code of a probe lattice point, thus the plurality of hash codes is determined from a plurality of probe lattice points. The hash code of each probe lattice point may be determined using the same hash function as used in step 530 of method 500, as described above using Equation (4). The plurality of probe lattice points form shells around the lattice hole, each shell being composed of one or more orbits.

A method 1400 of determining a set of canonical lattice points comprising a plurality of canonical lattice points, as executed at step 630, will be described below with reference to FIG. 14. The set of canonical lattice points are defined with respect to a canonical hole (or equivalently a canonical Delaunay cell). The method 1400 generates canonical lattice points sequentially, grouped into orbits. Each orbit has n+1 lattice points, an each lattice point of an orbing has a different remainder-k value. A method 700 of using canonical lattice points to determine the plurality of probe lattice points, will be described below with reference to FIG. 7.

After step 630, control is passed to retrieving step 640, where the plurality of hash codes, as determined in step 630, are each used to access the hash table 550, as created by method 500, to retrieve the payload data associated with matching hash codes. The method 600 concludes following step 640.

A method 1400 of determining a set of canonical lattice points comprising a plurality of canonical lattice points, as executed at step 630, will be described below with reference to FIG. 14.

A method 1400 of determining a plurality of canonical lattice points as executed at step 630, will now be described below with reference to FIG. 14. The method 1400 may be implemented as one or more software code modules of the software application program 1733 resident on the hard disk drive 1710 and being controlled in its execution by the processor 1705.

The method 1400 determines canonical lattice points for e number of extended shells for a quantisation space of n dimensions and thus the lattice representation space has n+1 dimensions.

An A* Delaunay cell may be fully specified by a sort vector p and a remainder-0 point $c_0$. For the canonical Delaunay cell, p is the identity permutation and $c_0=0$ (corresponding to the origin of the quantisation space). The sort vector p will specify an order of dimensions. The method 1400 of determining the canonical lattice points is based on a search starting from the lattice points forming the zeroth shell about the canonical Delaunay cell (i.e., the zeroth canonical shell comprises the vertices of the canonical Delaunay cell).

The search is kept simple by noting that when a remainder-0 lattice point, l=(n+1)c, is known to be in a particular shell, then n other remainder-k lattice points in the same shell can be determined, with k=1, 2, . . . , n. A set of n+1 lattice points that are related in this way may be referred to as an 'orbit'. An orbit contains n+1 lattice points, each lattice point of the orbit has a different remainder value, and each lattice point in the orbit is the same distance from the hole in the canonical Delaunay cell.

Figure 16:
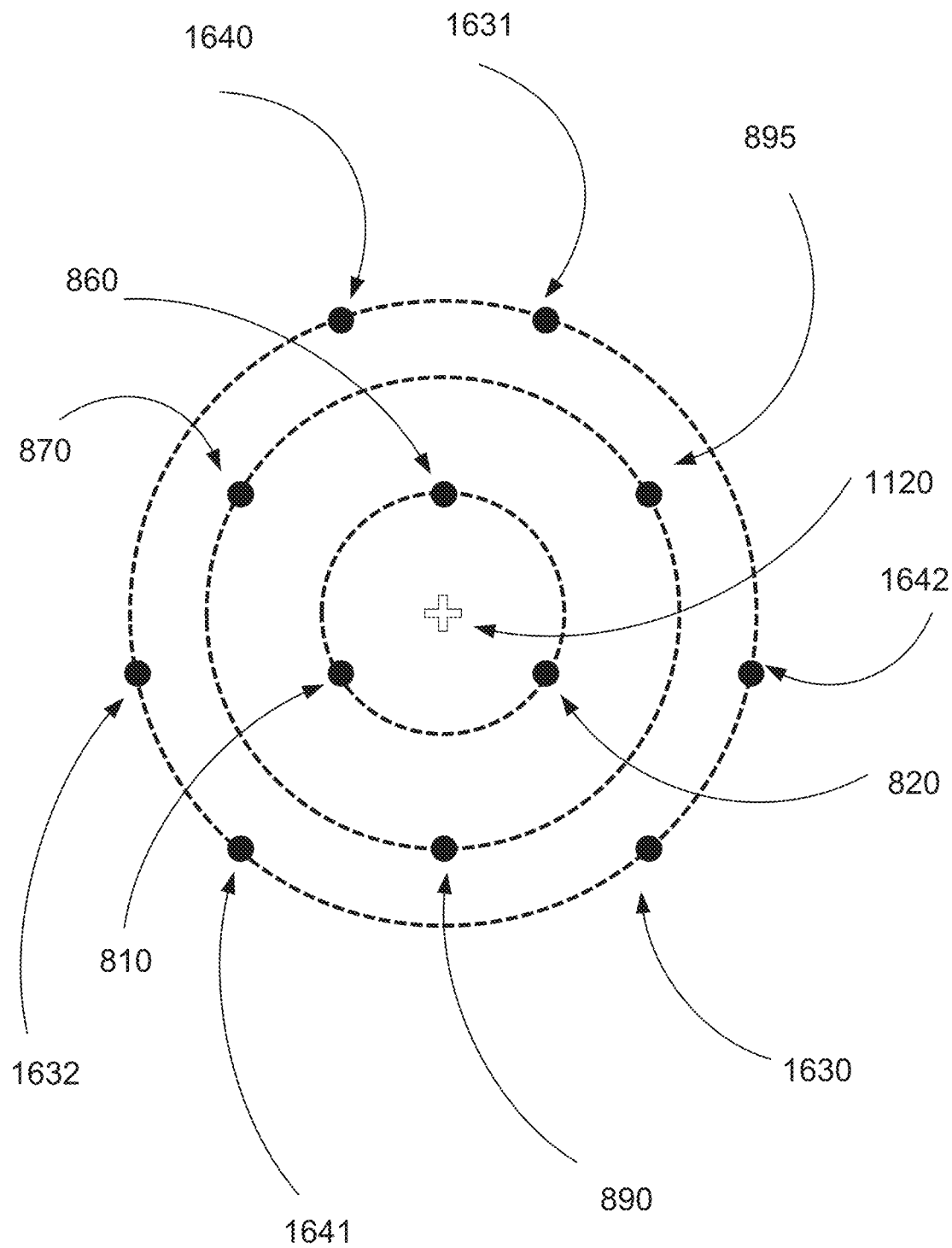
FIG. 16 shows four example orbits of an $A^*_2$ lattice arranged in three shells about a canonical hole.

FIG. 16 shows four example orbits for dimensionality n=2. FIG. 16 shows a portion of an $A^*_2$ lattice where a hole 1120 is a hole of the canonical Delaunay cell. Lattice point 810 is a remainder-0 lattice point in the zeroth extended shell, and therefore lattice point 810 is the origin of the lattice representation space. The orbit containing lattice point 810 also contains remainder-1 lattice point 820 and remainder-2 lattice point 860. Lattice point 895 is a remainder-0 lattice point in the first extended shell. The orbit containing lattice point 895 also contains remainder-1 lattice point 895 and remainder-2 lattice point 870. Lattice point 1630 is a remainder-0 lattice point in the second extended shell. The orbit containing lattice point 1630 also contains remainder-1 lattice point 1631 and remainder-2 lattice point 1632. Lattice point 1640 is another remainder-0 lattice point in the second extended shell. The orbit containing lattice point 1640 also contains remainder-1 lattice point 1641 and remainder-2 lattice point 1642.

The c-vectors of lattice points in an orbit are related in that the c-vector for the remainder-(k+1) lattice point may be determined from the c-vector for the remainder-k lattice point by rotating the coordinates up by one and then decrementing the zeroth coordinate. The described orbit may be used to efficiently determine all lattice points in a shell by first determining all remainder-0 points of the shell. Remainder-0 points are lattice points corresponding to vectors $c \in \mathbb{Z}^{n+1}$ where $\Sigma_{i=0}^{n} c[i]=0$. In the zeroth shell, there is only one such point, namely c=0.

Identifying lattice points in a shell is based on knowing the radius of the shell. The ith coordinate of the canonical hole is (2i−n)/2. From the formula of the ith coordinate of the canonical hole and Equation (3), it can be shown that the squared distance for a remainder-0 point is an increasing affine function of s(c), where $$s(c) = \frac{n+1}{2} \sum_{i=0}^{n} c[i]^2 - \sum_{i=0}^{n} i c[i].$$

Thus, the function s(c) returns an integer that is unique to each shell which contains a remainder-0 lattice point represented by c. In other words, if $s(c_a)=s(c_b)$ and both $c_a$ and $c_b$ represent remainder-0 lattice points then $c_a$ and $c_b$ are in the same shell. Therefore the function s(c) may be used to aid a search for shells of lattice points. Concentrating the search on vectors $c \in \mathbb{Z}^{n+1}$ where $\Sigma_{i=0}^{n} c[i]=0$ implies that lattice points in neighbouring shells will differ in exactly two coordinates of their c-vectors, where one is incremented by one (1) and another decremented by one (1).

Figure 14:
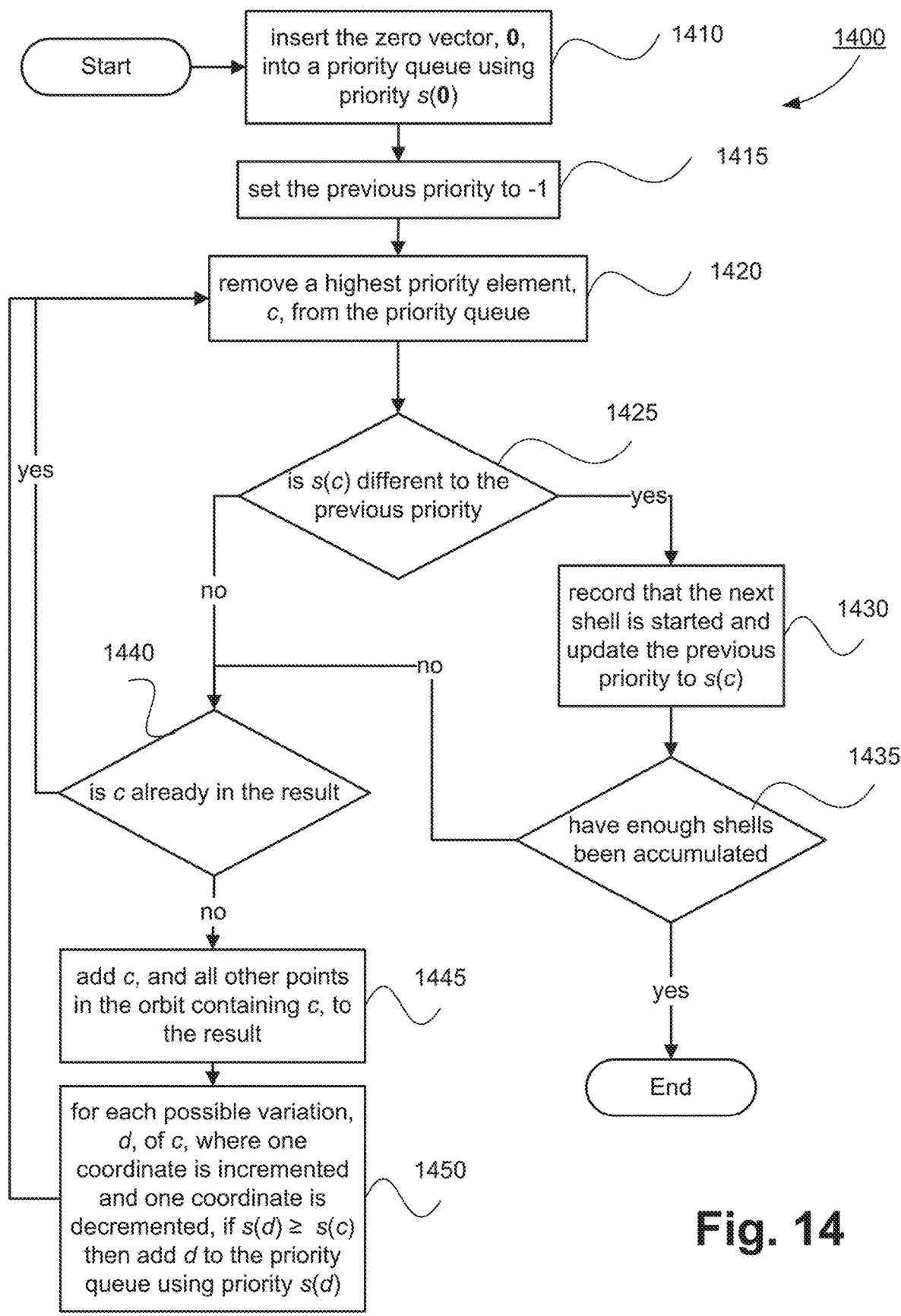
FIG. 14 is a schematic flow diagram showing a method of determining a plurality of canonical lattice points.
Figure 15:
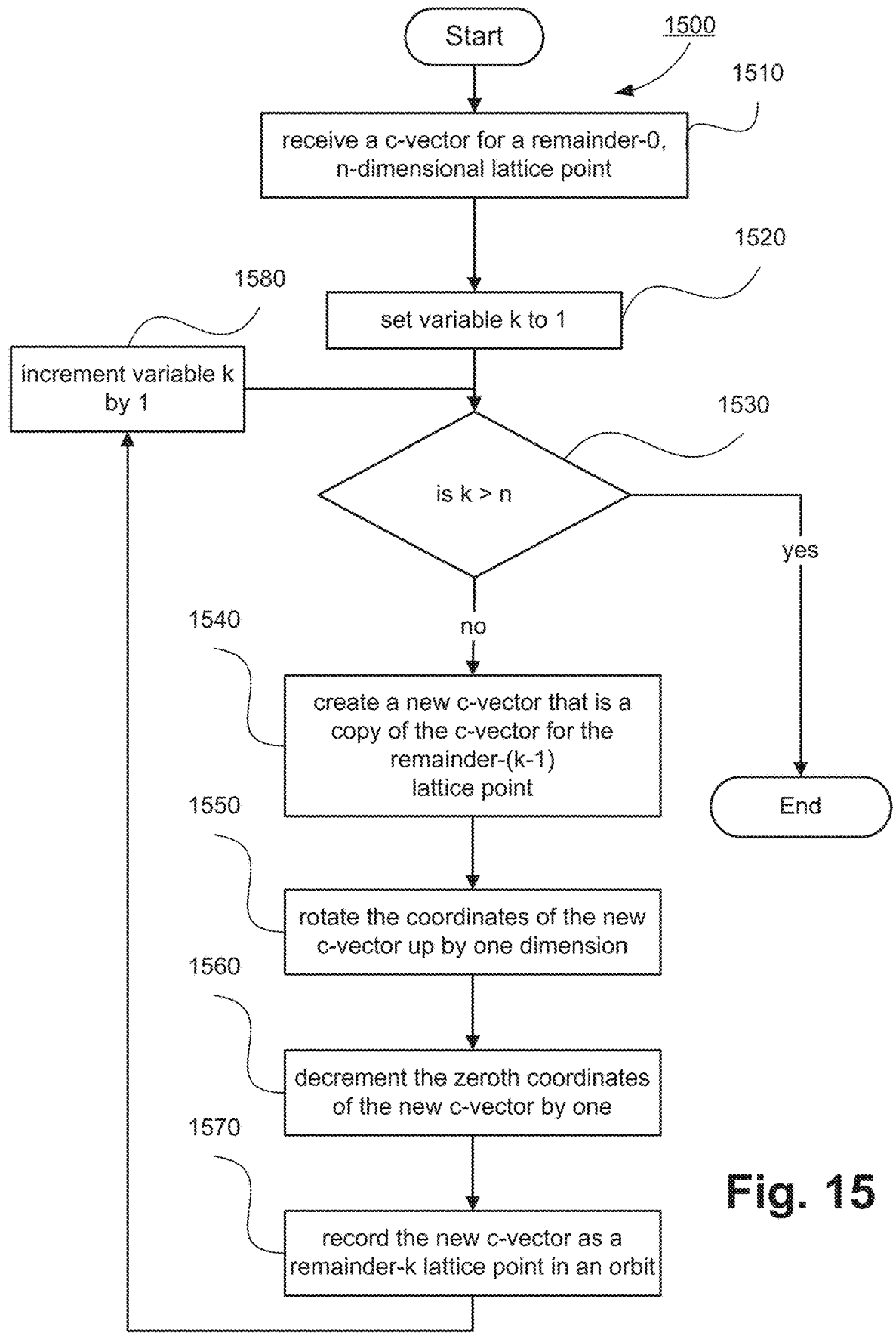
FIG. 15 is a flow diagram showing a method of determining a set of lattice points where each lattice point is in a shell about the hole of a canonical Delaunay cell.

The method 1400 shown in FIG. 14 may be used to determine the canonical lattice points for e number of extended shells in n dimensions. The method 1400 starts at inserting step 1410, where the zero vector, 0, is inserted into a priority queue using priority s(0), under execution of the processor 1705. Control then proceeds to setting step 1410, the priority queue is initialised with the 0 lattice point of the zeroth shell. The queue has priorities which are determined for an entry c using s(c). Lower values of s(c) are interpreted as higher priorities. Tied priorities require no special treatment. The value of function s(c) may be quickly determined using integer arithmetic by delaying or eliminating the division operation.

Next at initialising step 1415, variables t and m are each intialised to −1 under execution of the processor 1705. Variable t records the previous priority thus keeping track of the current shell identifier, as calculated by s(c). Variable m records the number of shells (excluding the zeroth shell) collected in a result buffer which is initially empty.

Control then passes from step 1415 to removing step 1420, a highest priority element, c, is removed from the priority queue. The element c is then checked at step 1425. In step 1425, if s(c)≠t (where t is the previous priority), then a new shell is about to start and so control is passed to recording step 1430, otherwise control is passed to checking step 1440.

At recording step 1430, the processor 1705 is executed to record that the next shell is started by incrementing m. Also at step 1430, the variable that records the previous priority is updated by setting t to s(c). Control is then passed to checking step 1435.

At checking step 1435, enough shells have been accumulated (i.e., if m>e), then the method 1400 terminates by returning the result buffer. Otherwise, if m≤e, then control is passed to step checking step 1440.

At checking step 1440, the highest priority element, c, that was removed from the priority queue in step 1420 is checked to determine if the highest priority element, c, is already in the result buffer. If the highest priority element, c, is already in the result buffer, then the highest priority element, c, is ignored and control is passed back to step 1420 where the next element in the priority query will be processed. If c was not in the results buffer, then control is passed to adding step 1445.

At adding step 1445, the highest priority element, c, and all other lattice points in the orbit containing priority element, c, are added to the result buffer configured, for example, in the memory 1706. The lattice points of the orbit may be determined using a method 1500 which will now be explained with reference to FIG. 15.

The method 1500 determines a set of lattice points that are in the orbit containing a given remainder-0 lattice point. The method 1500 may be implemented as one or more software code modules of the software application program 1733 resident on the hard disk drive 1710 and being controlled in its execution by the processor 1705.

The method 1500 begins at receiving step 1510, where a c-vector that represents a remainder-0 lattice point in an n-dimensional quantisation space is received. Next, is a loop with a loop variable k with values 1, 2, . . . , n. At initialising step 1520, loop variable k is set to one (1) followed by checking step 1530 where the loop variable k is tested. In step 1530 if loop variable k>n then the method 1500 terminates. Otherwise, control is passed to step 1540 which is the start of the body of the loop. At creation step 1540 a new c-vector is created. The new c-vector is a copy of the c-vector for the remainder-(k−1) lattice point. Next, control passes from step 1540 to rotating step 1550, where the coordinates of the new c-vector are rotated up by one dimension.

Control passes from step 1550 to decrementing step 1560, where the zeroth coordinate of the new c-vector is decremented by one. Next, at recording step 1570, the new c-vector is recorded as a remainder-k lattice point in the orbit of the given remainder-0 lattice point. After step 1570, control passes to incrementing step 1580, the loop variable for the next pass is prepared by incrementing the loop variable k by one (1) before control is passed back to step 1530.

Returning back to method 1400, after step 1445 is step 1450. At step 1450, the processor 1705 is executed to search for possible other remainder-0 lattice points that are either in the same shell as the current shell or are in shells beyond the current shell. A double loop may be used to generate all distinct possible pairs of coordinates (0,1), (0,2), . . . , (n−1,n). For a particular possible pair of coordinates (i,j) a possible variation d of c from step 1445 is given by first copying c to d, then incrementing d[i] and decrementing d[j]. The variation d may or may not be in a shell with a radius≥the shell containing c, so the variation d is checked. If s(d)≥s(c) then the variation d is added to the priority queue with priority s(d).

After step 1450, all possible pairs of coordinates are processed before control is then passed back to step 1420 to process the next element in the priority queue.

Figure 7:
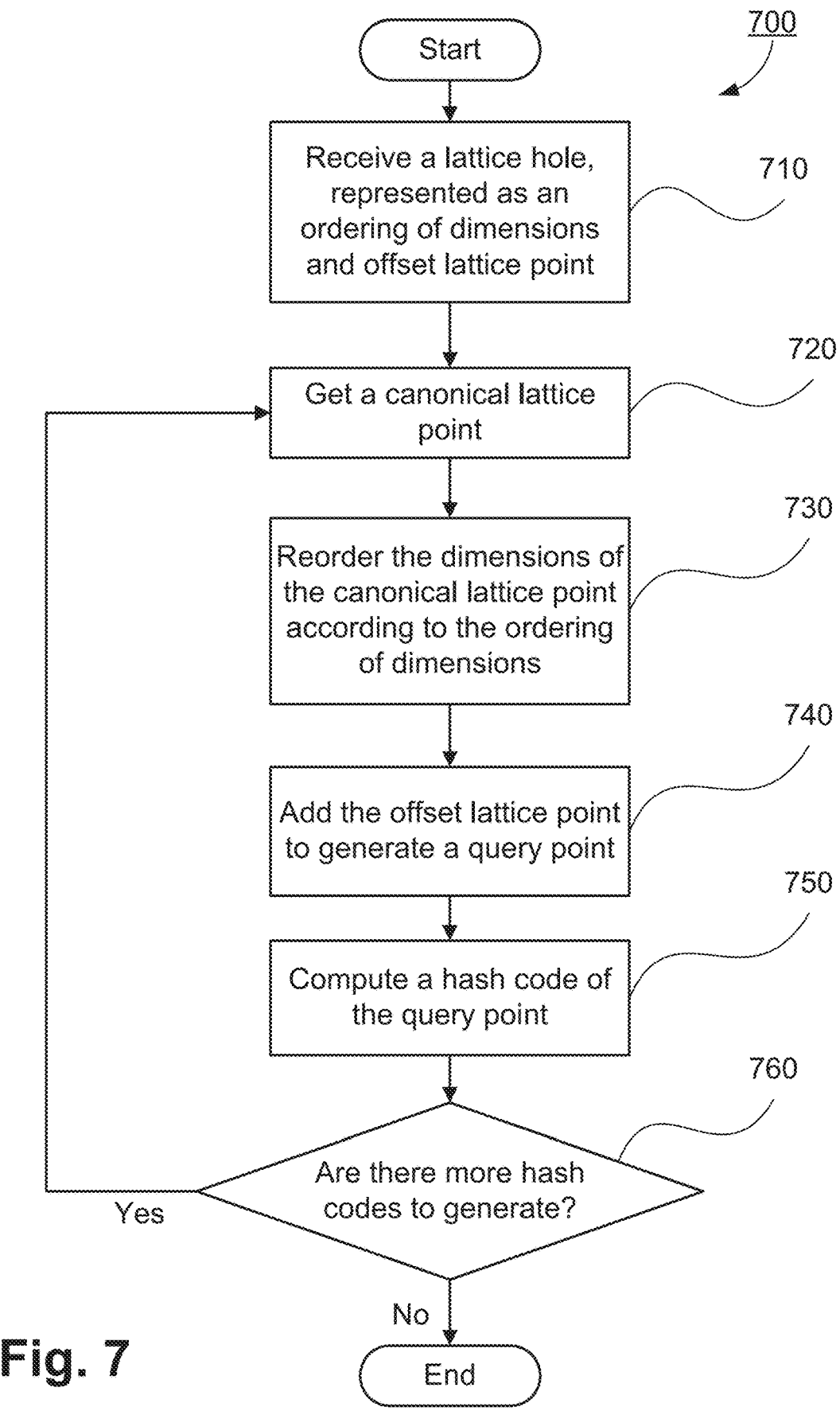
FIG. 7 is a schematic flow diagram showing a method of generating hash codes.

A method 700 of generating a plurality of hash codes, where each hash code is a hash function of a probe lattice point, the probe lattice points forming shells about an input lattice hole, will now be described with reference to FIG. 7. Each probe lattice point is determined from a canonical lattice point. Canonical lattice points are defined with respect to a canonical hole. Thus, a probe lattice point may be determined by mapping the canonical lattice point to the probe lattice point, by using the same mapping that maps the canonical hole to the input lattice hole.

The method 700 may be implemented as one or more software code modules of the software application program 1733 resident on the hard disk drive 1710 and being controlled in its execution by the processor 1705.

The method 700 starts at receiving step 710, where an input lattice hole is received, under execution of the processor 1705, where the lattice hole is represented as an offset vector (which is a c-vector of a remainder-0 lattice point) and a sort vector (which is an ordering of dimensions of the lattice representation space). Then control is passed to a receiving step 720, where a canonical lattice point is received from a store of previously calculated canonical lattice points. Then control is passed to reordering step 730 where the dimensions of the canonical lattice point are reordered, under execution of the processor 1705, according to the sort vector of the input lattice hole to create a partially mapped lattice point. Then control is passed to adding step 740, where the offset vector of the input lattice hole is added to the partially mapped lattice point, to form a probe lattice point. Thus, steps 730 and 740 combined will form a probe lattice point from a canonical lattice point and input lattice hole. If the input lattice hole is represented by offset c-vector l and sort vector p and the canonical lattice point is represented by c-vector c then the resulting probe lattice point is represented by a c-vector l' in accordance with Equation (5) as follows:

$$l'[i]=l[i]+c[p[i]] \quad (5).$$

where, for each dimension i of the lattice representation space, the ith coordinate of the resulting probe lattice point c-vector, l', is the sum of the ith coordinate of the offset c-vector, l, and a coordinate of the canonical lattice point c-vector, c, wherein the coordinate of the canonical lattice point c-vector is p[i], and where p[i] is the ith dimension in the ordering of dimensions p.

Control is then passed to a step 750 where a hash code is determined, under execution of the processor 1705, for the probe lattice point formed in step 740. The hash code of the probe lattice point is determined using the same hash function as used in step 530 of method 500, as described above using Equation (4). The hash code is then used to retrieve payload data as per step 640 of method 600. Control is then passed to checking step 760 where the method 700 checks to see if there are any remaining canonical lattice points to process. If there are any remaining canonical lattice points to process, then control is passed to step 720 where the next canonical lattice point is received for processing. Otherwise, the method 700 concludes.

Note that steps 730, 740 and 750 are each required to process every dimension of the lattice representation space of which there are n+1 dimensions. Thus, executing one pass of method 700 requires order O(n) operations. Also note that the probe lattice point are grouped into orbits where each orbit contains n+1 probe lattice points. Thus, the number of passes through method 700 is order O(n). To completely process method 700 requires order $O(n^2)$ operations, and thus when method 700 is used for step 630 of method 600, method 600 requires order $O(n^2)$ operations to process one query vector.

The following describes how the computational complexity of method 600 can be reduced by providing a method 200 as an alternative to method 700.

Figure 2:
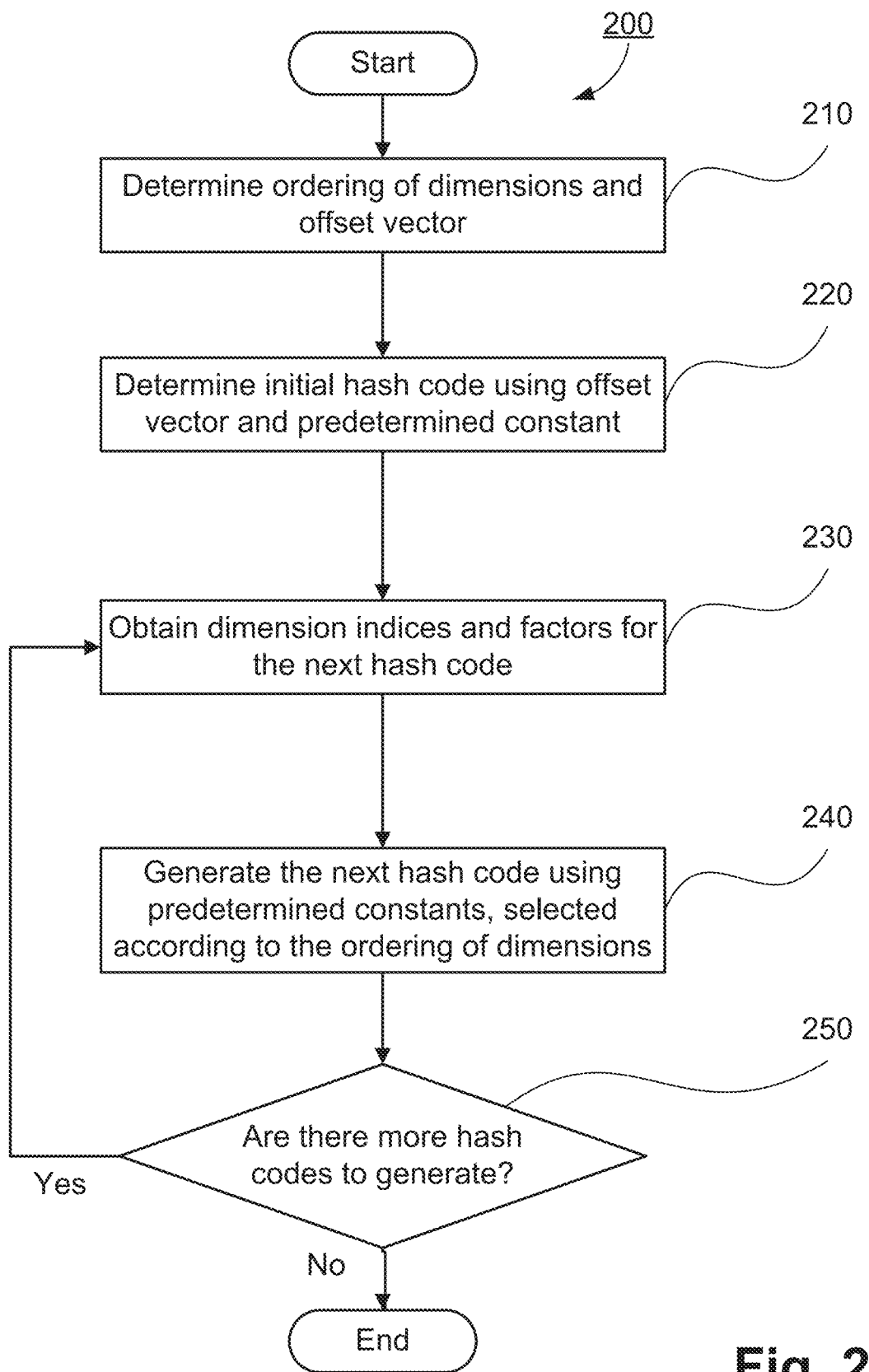
FIG. 2 is a schematic flow diagram showing a method of generating hash codes.

A method 200 of generating hash codes will now be described with reference to FIG. 2. Method 200 generates hash codes that are the same as the hash codes generated in accordance with the method 700. The method 200 is thus suitable for generating hash codes that are based on probe lattice points, where the probe lattice points are mapped from canonical lattice points, and where the mapping is the same as the mapping to a lattice hole from a canonical lattice hole. The method 200 may be implemented as one or more software code modules of the software application program 1733 resident on the hard disk drive 1710 and being controlled in its execution by the processor 1705.

The computational complexity of method 700 is order $O(n^2)$ operations whereas the computational complexity of method 200 is order O(n) operations. Thus, method 200 provides a significant speed advantage for high dimensional searching.

The method 200 uses a characteristic of c-vectors of lattice points that form shells about a lattice hole, namely that the c-vectors may be placed in a sequence such that there are only a few differences between any two successive c-vectors, where the number of differences between any two successive c-vectors is largely independent of the dimensionality of the lattice.

Figure 8:
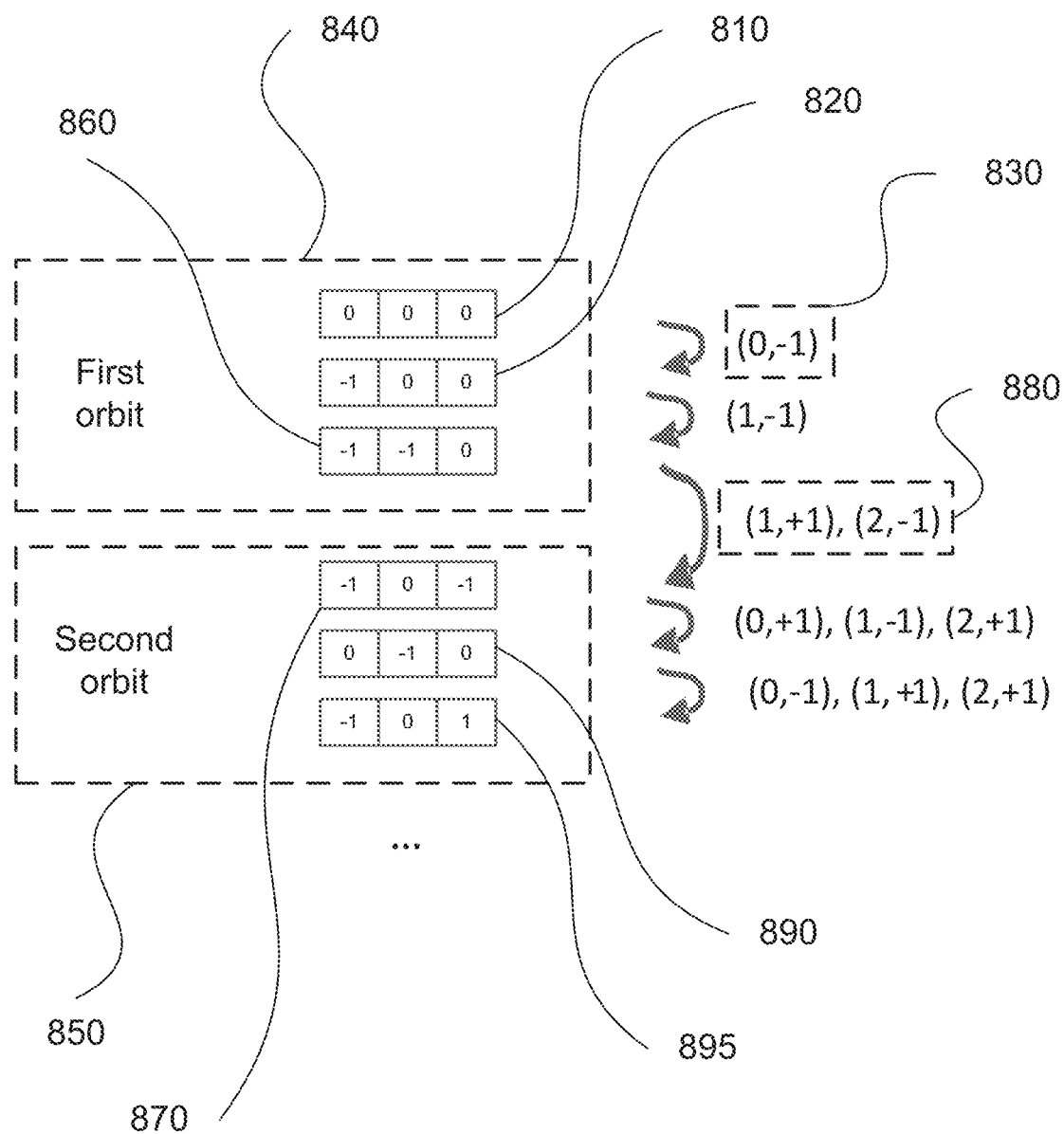
FIG. 8 is a diagram showing two (2)-dimensional canonical lattice points from two orbits, where each canonical lattice point corresponds to a hash code of a multi-probe locality sensitive hash method.

FIG. 8 is a diagram showing two (2)-dimensional canonical lattice points from two orbits, where each canonical lattice point corresponds to a hash code of a multi-probe locality sensitive hash method. Each orbit of the example of FIG. 8 has been generated using the method 1400. However, the order of lattice points in every second orbit has been reversed. In the method 1400, a first lattice point 810 of a first orbit 840, will have coordinate value zero (0) for every dimension of the lattice representation space. For a non-reversed orbit, all but the first lattice point is obtained as a function of the previous lattice point, where the function rotates coordinates left (up) by one dimension then subtracts one (1) from the first dimension (dimension 0). In the example of FIG. 8, the method 1400 leads to a second lattice point 820 of the first orbit 840 that is a function of the first lattice point 810 of the first orbit 840, and a third lattice point 860 of the first orbit 840 that is a function of the second lattice point 820 of the first orbit 840. The second orbit 850 is a reverse orbit, thus generation of the orbit using method 1400 may start with a third lattice point 895 of the second orbit 850 which has the coordinate values (−1, 0, 1) as obtained using the method 1400. Thus, a second lattice point 890 of the second orbit is a function of the third lattice point 895 of the second orbit 850, and a first lattice point 870 of the second orbit 850 that is a function of the second lattice point 890 of the second orbit 850. As the second orbit is reversed, the resulting sequence of canonical lattice points is 810, 820, 860, 870, 890 then 895, even though the method 1400 may generate the canonical lattice points in the order 810, 820, 860, 895, 890 then 870. The method 1400 may be repeated to generate more orbits of canonical lattice points.

FIG. 8 additionally shows the differences between pairs of lattice points that are adjacent in the sequence. The differences 830 between lattice point 810 and 820 contains one difference, namely that dimension 0 has a factor of −1. The term 'factor' is used here to mean the magnitude and sign of a difference for one dimension. The differences 880 between lattice point 860 and 870 contains two differences, namely that dimension one (1) has a factor of +1 and dimension two (2) has a factor of −1. It will be apparent that the number of differences between any pairs of lattice points that are adjacent in the sequence, in the first two orbits in two dimensions is one, two or three, which is also the case for higher dimensions.

Figure 11:
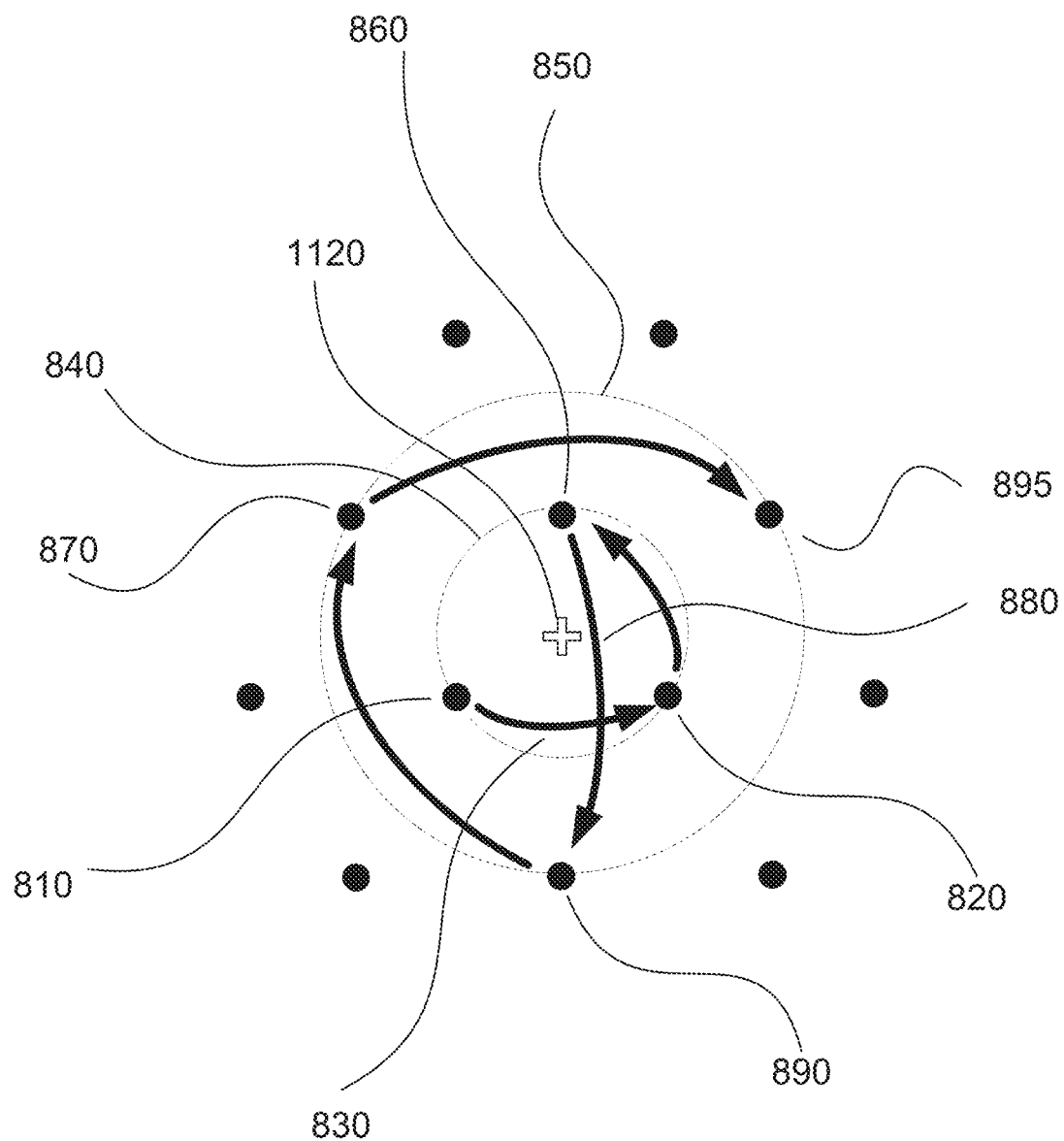
FIG. 11 is a diagram showing an ordering of canonical lattice points for the two (2)-dimensional canonical lattice points from two orbits of FIG. 8.

FIG. 11 is a diagram showing an ordering of canonical lattice points for the two (2)-dimensional canonical lattice points from two orbits of FIG. 8. FIG. 11 shows twelve lattice points, including the first lattice point 810 of the first orbit 840 and the first lattice point 870 of the second orbit 850. The orbits form shells of lattice points about a canonical hole 1120. Bold arrows indicate the differences between pairs of lattice points that are adjacent in the sequence, for example, difference 830 between the first lattice point 810 of the first orbit 840 and the second lattice point 820 of the first orbit 840.

Figure 9:
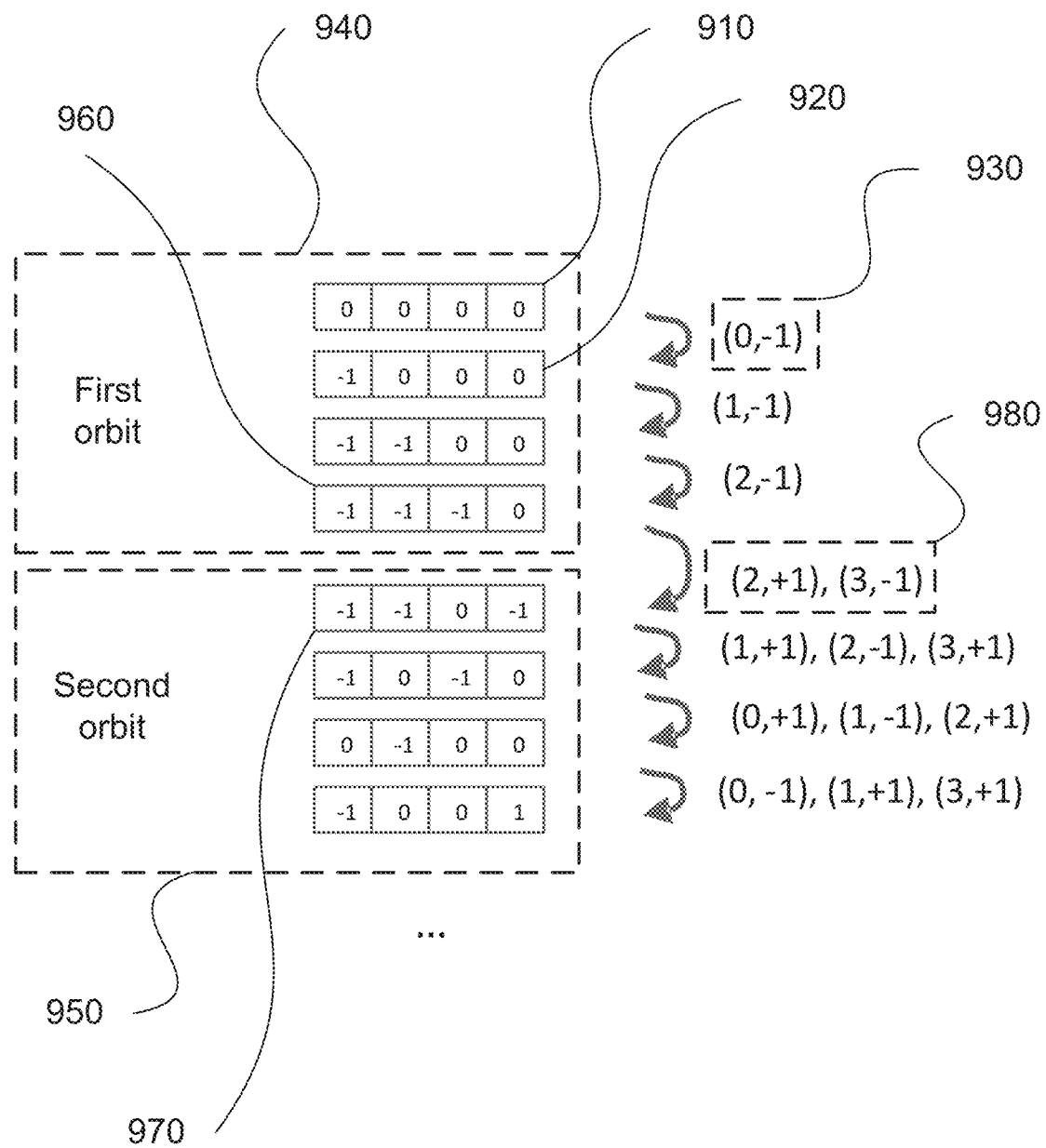
FIG. 9 is a diagram showing three (3)-dimensional canonical lattice points from two orbits, where each canonical lattice point corresponds to a hash code of a multi-probe locality sensitive hash method.

FIG. 9 is a diagram showing three (3)-dimensional canonical lattice points from two orbits, where each canonical lattice point corresponds to a hash code of a multi-probe locality sensitive hash method. FIG. 9 shows a first orbit 940 and a second orbit 950. There are four (4) lattice points in the first orbit 940 which are in forward order and there are four (4) lattice points in the second orbit 950 which are in reverse order. Also shown in FIG. 9 are the differences between pairs of lattice points that are adjacent in the sequence. A first lattice point 910 of the first orbit 940 has coordinate value zero (0) for every dimension of the lattice representation space. A second lattice point 920 of the first orbit 940 has coordinates (−1, 0, 0, 0). A forth lattice point 960 of the first orbit 940 has coordinates (−1, −1, −1, 0). A first lattice point 970 of a second orbit 950 has coordinates (−1, −1, 0, −1). The differences 930 between lattice point 910 and 920 contains one difference, namely that dimension 0 has a factor of −1. The differences 980 between lattice point 960 and 970 contains two differences, namely that dimension one (1) has a factor of +1 and dimension two (2) has a factor of −1. It will be apparent that the number of differences between any pairs of lattice points that are adjacent in the sequence, in the first two orbits in three dimensions is one, two or three.

Figure 10:
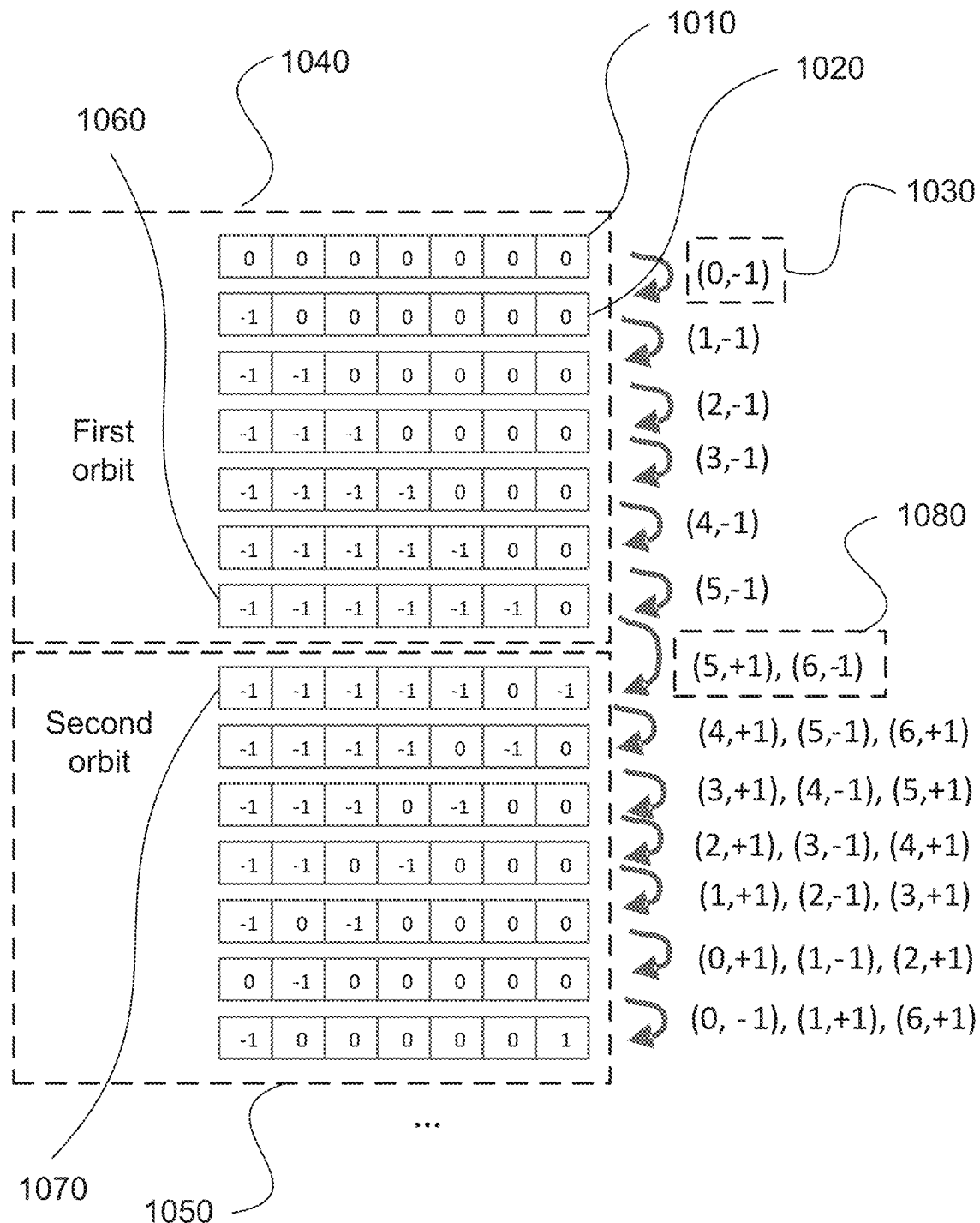
FIG. 10 is a diagram showing six (6)-dimensional canonical lattice points from two orbits, where each canonical lattice point corresponds to a hash code of a multi-probe locality sensitive hash method.

FIG. 10 is a diagram showing six (6)-dimensional canonical lattice points from two orbits, where each canonical lattice point corresponds to a hash code of a multi-probe locality sensitive hash method. FIG. 10 shows a first orbit 1040 and a second orbit 1050. There are seven (7) lattice points in the first orbit 1040 which are in forward order and there are seven (7) lattice points in the second orbit 1050 which are in reverse order. Also shown in FIG. 10 are the differences between pairs of lattice points that are adjacent in the sequence. A first lattice point 1010 of the first orbit 1040 has coordinate value zero (0) for every dimension of the lattice representation space. A second lattice point 1020 of the first orbit 1040 has coordinates (−1, 0, 0, 0, 0, 0). A seventh lattice point 1060 of the first orbit 1040 has coordinates (−1, −1, −1, −1, −1, −1, 0). A first lattice point 1070 of a second orbit 1050 has coordinates (−1, −1, −1, −1, −1, 0, −1). The differences 1030 between lattice point 1010 and 1020 contains one difference, namely that dimension zero (0) has a factor of −1. The differences 1080 between lattice point 1060 and 1070 contains two differences, namely that dimension five (5) has a factor of +1 and dimension six (6) has a factor of −1. It will be apparent that the number of differences between any pairs of lattice points that are adjacent in the sequence, in the first two orbits in six dimensions is one, two or three.

As described above, the canonical lattice points may be placed in a sequence such that there are only a few differences between any two successive c-vectors, where the number of differences is largely independent of the dimensionality of the lattice. It is also possible to ensure that the first lattice point has coordinate value zero (0) for every dimension of the lattice representation space. One such sequence is where every second orbit is represented in reversed order.

Method 200 represents a sequence of canonical lattice points as a sequence of differences. Also, for convenience, the powers of thirty one (31) from Equation (4) may be precalculated into a table r such that $r[i]=31^i$. As described above, using powers of thirty one (31) is a method of creating predetermined constants that lead to good hash codes. However, any useful set of predetermined constants may be used. Furthermore, the precalculation of the predetermined constants as a table may be performed. However, the predetermined constants do not need to be precalculated to implement the method 200.

The method 200 starts at order determining step 210, where an input lattice hole is determined, where the lattice hole is represented as an offset vector, l, (which is a c-vector of a remainder-0 lattice point) and a sort vector, p, (which is an ordering of dimensions of the lattice representation space).

Then control is passed to initial hash code determining step 220, where an initial hash code, $h_1$, is determined under execution of the processor 1705. As the first canonical lattice point has coordinate value zero (0) for every dimension of the lattice representation space, the initial hash code may be determined according to Equation (6) as follows:

$$h_1 = \Sigma_{i=0}^n r[i]l[i] \bmod 2^{64} \quad (6).$$

wherein the initial hash code, $h_1$, is the sum of product terms for each value of an indexing variable, i, where i=0, 1, ... n, and where each product term is the product of the ith predetermined constant from table r and the ith dimension of the offset vector, l. The initial hash code, $h_1$, may be determined in modulo $2^{64}$ arithmetic. The initial hash code is thus determined based on a plurality of predetermined constants.

The initial hash code may be determined in modulo $2^{64}$ arithmetic so that hash codes fit conveniently within a 64 bit integer; any other size integer may be suitable. If 64-bit unsigned integer arithmetic is used, then the mod $2^{64}$ operation need not be explicitly implemented as allowing the integers to overflow is an equivalent operation.

The initial hash code may then be used to access a hash table such as hash table 550. Then control is passed to obtaining step 230.

Step 230 along with a subsequent step 240 are used for generating a next hash code (i.e., subsequent hash code) from a previous hash code. The two steps 230 and 240 may be processed multiple times in a loop; in a first time the previous hash code is the initial hash code. Also at step 230, a difference between the previous hash code and the next hash code which correspond to a previous canonical lattice point and next canonical lattice point respectively is determined under execution of the processor 1705. The differences may be pre-calculated and may be represented as an index, i, where the index indicates a dimension and as a factor, $d_i$, where the factor indicates the sign and magnitude of the difference in dimension i between the previous canonical lattice point and the next canonical lattice point.

There may be one or more differences between the previous canonical lattice point and the next canonical lattice point. For example, there may be a single difference such as difference 830 from FIG. 8, or there may be multiple differences such as the difference 880 from FIG. 8. Let the complete set of differences between the previous canonical lattice point and the next canonical lattice point be represented by D where D={(i,d$_i$)|i= ... }. In one arrangement, values of d$_i$ may be restricted to be either +1 or −1. In such an arrangement, when a factor needs to be of a larger magnitude than one (1), then multiple differences may be included in D to achieve the same result as including in D a smaller number of differences with larger magnitudes.

Control is then passed to generating step 240, where the next hash code (i.e., a subsequent hash code to the initial hash code) is generated using the predetermined constants, selected according to the ordering of dimensions as represented by the sort vector, p, and the set of differences between the previous canonical lattice point and the next canonical lattice point, D. The next hash code, h$_2$, may be determined by modifying the initial hash code, h$_1$, according to Equation (7) as follows:

$$h_2 = h_1 + \Sigma_{(i,d_i) \in D} \, d_i \, r[p[i]] \bmod 2^{64} \qquad (7).$$

where the next hash code, h$_2$, is the sum of the previous hash code, h$_1$, and the sum of each difference term generated for each difference, (i,d$_i$) in the complete set of differences, D, where i is an index indicating a dimension and d$_i$ is a factor associated with the indexed dimension of the difference, and where each difference term is the product of the factor d$_i$ and a predefined constant, r[p[i]], chosen to be the constant at a location p[i] in the table r, and where p[i] is the ith dimension in the ordering of dimensions p. The next hash code, h$_2$, may be determined in modulo $2^{64}$ arithmetic.

The next hash code may be generated in modulo $2^{64}$ arithmetic so that hash codes fit conveniently within a 64 bit integer; any other size integer may be suitable. If 64-bit unsigned integer arithmetic is used, then the mod $2^{64}$ operation need not be explicitly implemented as allowing the integers to overflow is an equivalent operation.

The next hash code may then be used to access a hash table such as hash table 550. Then control is passed to decision step 250.

At step 250, if there are any additional hash codes to be generated, then control is passed to step 230 where what is currently referred to as the next hash code will be subsequently referred to as a previous hash code (and so on iteratively). If there are no more hash code to be generated, then the method 200 terminates.

Figure 12:
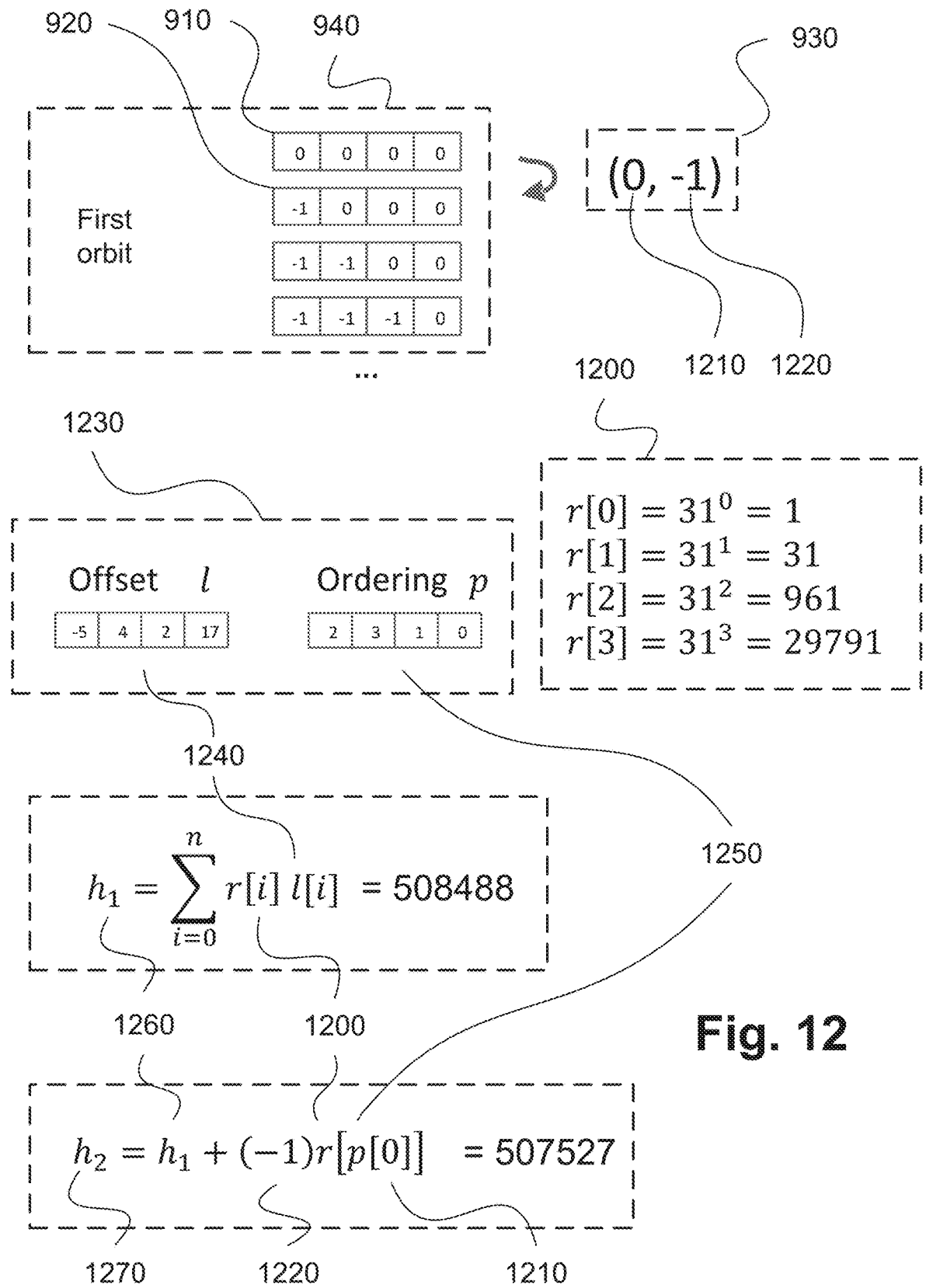
FIG. 12 is a schematic diagram showing detailed components of the method of FIG. 2.

The method 200 will be described by way of example with reference to FIG. 12. FIG. 12 shows a three (3)-dimensional worked example of the method 200 where, as at step 210, a lattice hole 1230 is determined. The lattice hole 1230 is represented as an ordering of dimensions 1250, denoted as p=(2, 3, 1, 0) and offset vector 1240, denoted as l=(−5, 4, 2, 17). Predetermined constants 1200 are denoted as r=[1, 31, 961, 29791] which are powers of thirty-one (31). After method 200 processes step 220 an initial hash code 1260, h$_1$, is determined according to Equation (6) as h$_1$=1×−5+31×4+961×2+29791×17=508488, which as a 64 bit hexadecimal number is 0000 0000 0007 C248. In the example of FIG. 12, a first lattice point 910 of a first orbit 940 has the coordinates (0, 0, 0, 0), and a second lattice point 920 of a first orbit 940 has the coordinates (−1, 0, 0, 0). The first difference 930 has index 1210 with value zero (0), and a difference 1220 with value −1. Thus, method 200 will obtain dimension index 1210 and factor 1220 when processing step 230.

As at step 240, a next hash code is determined by modifying the initial hash code, h$_1$, according to Equation (7) as h$_2$=508488+(−1)961=507527, which as a 64 bit hexadecimal number is 0000 0000 0007 BE87.

As described above, a sequence of canonical lattice points is determined. Differences between pairs of lattice points that are adjacent in the sequence are also determined. The sequence may be constructed such that there is a small number of differences between any pair of lattice points that are adjacent in the sequence, and the number of differences per adjacent pair is largely independent of the dimensionality of the lattice.

As described with reference to FIGS. 8, 9, 10 and 11, a sequence of canonical lattice points may be determined by reversing every second orbit as generated by method 1400. Other methods may also be used to create a preferable sequence of canonical lattice points.

For example, given a plurality of canonical lattice points, a plurality of possible sequences may be evaluated and a sequence selected from the plurality of possible sequences, such that the selected sequence minimises the number of resulting differences. The selected sequence may be determined using an integer programming method or energy minimisation method.

In another arrangement, the canonical lattice points may be arranged in a tree sequence instead of a line sequence. Multiple subsequent hash codes may be determined from a previous hash code by applying differences from multiple branches in the tree sequence.

A tree sequence may be determined by determining a minimum spanning tree over a graph. The graph may be defined with a node for each canonical lattice point and a weighted edge between a pair of nodes where the weight is a count of the number of differences between the pair of canonical lattice points associated with the pair of nodes.

In another arrangement, the canonical lattice points may be arranged in a tree sequence of canonical lattice points such that a canonical lattice point at the origin of the quantisation space is at the root of the tree, and such that for each canonical lattice point in the tree that is a child in the tree, the canonical lattice point has exactly one difference between the canonical lattice point and the parent of the canonical lattice point in the tree. The tree sequence of canonical lattice points may be converted into a sequence of instructions that can be executed with the aid of a stack structure for recoding hash codes. The sequence of instructions may then be used to execute method 200.

Each instruction of the sequence of instructions formed from the tree sequence of canonical lattice points comprises three parts: a pop part, a dimension part, and a factor part. Each part of the instruction may be represented by a single integer. The sequence of instructions may be used to generate hash codes using the method 200 of FIG. 2, where an initial hash code is placed on a stack as at step 220. Then step 230 may be executed to access an instruction from the sequence of instructions to provide a pop part, a dimension part, and a difference part. A value of the dimension part is a dimension index and a value of the factor part is a factor. As described below, a next hash code may then be generated by executing the instruction comprising the pop part, the dimension part, and the difference part. Step 240 of the method 200 is executed to execute the instruction where the stack is popped by the number of times indicated by the pop part so that the stack is either the same size (i.e., if the pop part was zero) or is smaller (i.e., if the pop part was positive). Once the pop part of the instruction is executed, the stack has a previous hash code at the top of the stack. The next hash code is determined according to Equation (7) as described above, noting that only one difference is available as provided by the dimension part and the factor part of the instruction. The next hash code is then pushed onto the stack, thus increasing the stack size by one and leaving the next hash code at the top of the stack. Step 250 of the method 200 may then me executed to test if there are any additional hash codes to be generated by testing if there are any more instructions to process in the sequence of instructions.

A sequence of instructions may be determined from a tree sequence of canonical lattice points by performing a depth-first traversal of the tree sequence of canonical lattice points starting at the root of the tree sequence and visiting each canonical lattice point that is a child in the tree once. When a canonical lattice point is visited by the depth-first traversal, the canonical lattice point has exactly one difference, $(i, d_i)$, between the canonical lattice point and the parent of the canonical lattice point in the tree. An instruction is appended to the sequence of instructions for each canonical lattice point visited by the depth-first traversal where the dimension part indicates the dimension, i, of the difference and where the factor part indicates the factor, $d_i$, of the difference. The pop part of the instruction is determined by the behaviour of the depth-first traversal. If a canonical lattice point is visited by the depth-first traversal by going one level deeper, then the pop part is zero. Otherwise, the pop part indicates a change in depth performed by the depth-first traversal in order to visit the canonical lattice point. As described above, an input record is associated with a lattice point where the lattice point is a nearest lattice point to a feature vector which is associated with the input record.

In an alternative arrangement, an input record may be associated with a lattice point other than a nearest lattice point, but is sufficiently close based on the use of a balancing radius.

In yet another alternative arrangement, an input record may be associated with a plurality of lattice points other than a single lattice point, where the plurality of lattice points is selected to be nearby to a feature vector which is associated with the input record.

The described methods may be used to provide rapid access to records that are associated with feature vectors. The methods are particularly useful where different but similar feature vectors are required to be treated as matching feature vectors.

Examples of feature vectors include the following:
  (i) features of an image such as a GIST descriptor;
  (ii) features of an image region or image patch such as Scale Invariant Feature Transform (SIFT) features;
  (iii) spatial characteristics of an image region or image patch such as its location in the image;
  (iv) colour characteristics of an image region or image patch such as a colour histogram;
  (v) a paper-fingerprint of a portion of a piece of paper;
  (vi) features of a video region or video patch such as Histogram Of Flow (HOF) features;
  (vii) features of an audio signal such as the energies in particular frequency bands, or statistics thereof;
  (viii) features of an audio signal such as the timing of volume envelope aspect such as 'attack', 'decay', 'sustain' and 'release', or statistics thereof;
  (ix) features of textual data such as word counts, bi-gram counts, or n-gram counts, or statistics thereof; and
  (x) concatenations and/or functions of other features and/or feature vectors.

Examples of records include the following:
  (i) audit information for the production, editing, printing, rendering, playing of media including still images, videos, audio, and textual media;
  (ii) media provenance information;
  (iii) media segmentation information;
  (iv) media recognition or classification information;
  (v) copyright, security, access control and authenticity information; and
  (vi) concatenations of, functions of, and/or references to other records.

INDUSTRIAL APPLICABILITY

The arrangements described are applicable to the computer and data processing industries and particularly for the described arrangements.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a matching image region which matches with a region of a query image, in a database of images, using a query vector formed from the region of the query image, wherein the image region is stored in a hash table using a hash code of a lattice point corresponding to a feature vector of the image region, the method comprising:
   determining a lattice hole which is located nearest to the query vector of the query image in a permutohedral lattice, an ordering of dimensions which represents a mapping applied to transform a canonical hole of the permutohedral lattice to the lattice hole, and an offset vector;
   determining an initial hash code for a first point around the lattice hole in the permutohedral lattice, based on the query vector, using the offset vector and a plurality of predetermined constants;
   generating at least one subsequent hash code for a second point around the lattice hole in the permutohedral lattice, from the initial hash code by modifying the initial hash code by a multiple of a constant, the constant being selected from the plurality of predetermined constants using the determined ordering of dimensions; and
   determining the matching image region in the database of images by retrieving data from the hash table using a plurality of hash codes including the initial hash code and the at least one subsequent hash code.

2. The method according to claim 1, wherein the initial hash code is the sum of product terms for each value of an indexing variable.

3. The method according to claim 1, further comprising reversing every second orbit.

4. The method according to claim 1, wherein the first and second point are arranged in tree sequence.

5. The method according to claim 4, further comprising applying differences from multiple branches in the tree sequence.

6. The method according to claim 4, further comprising determining a minimum spanning tree over a graph.

7. The method according to claim 1, wherein the subsequent hash code is generated by executing an instruction comprising a pop part, dimension part and factor part.

8. A system for determining a matching image region which matches with a region of a query image, in a database of images, using a query vector formed from the region of the query image, wherein the image region is stored in a hash table using a hash code of a lattice point corresponding to a feature vector of the image region, the system comprising:
a memory for storing data and a computer program;
a processor for executing said computer program, said computer program comprising code for:
determining a lattice hole which is located nearest to the query vector of the query image in a permutohedral lattice, an ordering of dimensions which represents a mapping applied to transform a canonical hole of the permutohedral lattice to the lattice hole, and an offset vector;
determining an initial hash code for a first point around the lattice hole in the permutohedral lattice, based on the query vector, using the offset vector and a plurality of predetermined constants;
generating at least one subsequent hash code for a second point around the lattice hole in the permutohedral lattice, from the initial hash code by modifying the initial hash code by a multiple of a constant, the constant being selected from the plurality of predetermined constants using the determined ordering of dimensions; and
determining the matching image region in the database of images by retrieving data from the hash table using a plurality of hash codes including the initial hash code and the at least one subsequent hash code.

9. An apparatus for determining a matching image region which matches with a region of a query image, in a database of images, using a query vector formed from the region of the query image, wherein the image region is stored in a hash table using a hash code of a lattice point corresponding to a feature vector of the image region, the apparatus comprising:
means for determining a lattice hole which is located nearest to the query vector of the query image in a permutohedral lattice, an ordering of dimensions which represents a mapping applied to transform a canonical hole of the permutohedral lattice to the lattice hole, and an offset vector;
means for determining an initial hash code for a first point around the lattice hole in the permutohedral lattice, based on the query vector, using the offset vector and a plurality of predetermined constants;
means for generating at least one subsequent hash code for a second point around the lattice hole in the permutohedral lattice, from the initial hash code by modifying the initial hash code by a multiple of a constant, the constant being selected from the plurality of predetermined constants using the determined ordering of dimensions; and
means for determining the matching image region in the database of images by retrieving data from the hash table using a plurality of hash codes including the initial hash code and the at least one subsequent hash code.

10. A computer readable medium having a computer program stored thereon for causing a processor to perform a method for determining a matching image region which matches with a region of a query image, in a database of images, using a query vector formed from the region of the query image, wherein the image region is stored in a hash table using a hash code of a lattice point corresponding to a feature vector of the image region, the method comprising:
determining a lattice hole which is located nearest to the query vector of the query image in a permutohedral lattice, an ordering of dimensions which represents a mapping applied to transform a canonical hole of the permutohedral lattice to the lattice hole, and an offset vector;
determining an initial hash code for a first point around the lattice hole in the permutohedral lattice, based on the query vector, using the offset vector and a plurality of predetermined constants;
generating at least one subsequent hash code for a second point around the lattice hole in the permutohedral lattice, from the initial hash code by modifying the initial hash code by a multiple of a constant, the constant being selected from the plurality of predetermined constants using the determined ordering of dimensions; and
determining the matching image region in the database of images by retrieving data from the hash table using a plurality of hash codes including the initial hash code and the at least one subsequent hash code.

11. The method according to claim 1, wherein the method further comprises dividing the query image into patches, and one or more of the following:
(i) creating a feature vector for each patch of the patches;
(ii) comparing the feature vector for each patch of the patches with a feature vector for another patch of the patches to create matching or similar pairs, where the matching or similar pairs have matching or similar feature vectors;
(iii) using the feature vector created for each patch to store and retrieve the matching or similar pairs in a database and/or a memory; and
(iv) assigning, and/or using voting, weighted voting, or a Markov random field to assign, a classification to each pixel of the query image to generate classified regions of the query image, wherein in a case where weighted voting is used, a weight is determined based on a quality of the match between feature vectors.

12. The system according to claim 8, wherein the processor further operates to divide the query image into patches, and to perform one or more of the following:
(i) create a feature vector for each patch of the patches;
(ii) compare the feature vector for each patch of the patches with a feature vector for another patch of the patches to create matching or similar pairs, where the matching or similar pairs have matching or similar feature vectors;
(iii) use the feature vector created for each patch to store and retrieve the matching or similar pairs in a database and/or a memory; and
(iv) assign, and/or use voting, weighted voting, or a Markov random field to assign, a classification to each pixel of the query image to generate classified regions of the query image, wherein in a case where weighted voting is used, a weight is determined based on a quality of the match between feature vectors.

13. The apparatus according to claim 9, wherein the apparatus further comprises means for dividing the query image into patches, and means for performing one or more of the following:
(i) creating a feature vector for each patch of the patches;

(ii) comparing the feature vector for each patch of the patches with a feature vector for another patch of the patches to create matching or similar pairs, where the matching or similar pairs have matching or similar feature vectors;
(iii) using the feature vector created for each patch to store and retrieve the matching or similar pairs in a database and/or a memory; and
(iv) assigning, and/or using voting, weighted voting, or a Markov random field to assign, a classification to each pixel of the query image to generate classified regions of the query image, wherein in a case where weighted voting is used, a weight is determined based on a quality of the match between feature vectors.

14. The medium according to claim 10, wherein the method further comprises dividing the query image into patches, and one or more of the following:
(i) creating a feature vector for each patch of the patches;
(ii) comparing the feature vector for each patch of the patches with a feature vector for another patch of the patches to create matching or similar pairs, where the matching or similar pairs have matching or similar feature vectors;
(iii) using the feature vector created for each patch to store and retrieve the matching or similar pairs in a database and/or a memory; and
(iv) assigning, and/or using voting, weighted voting, or a Markov random field to assign, a classification to each pixel of the query image to generate classified regions of the query image, wherein in a case where weighted voting is used, a weight is determined based on a quality of the match between feature vectors.

* * * * *